United States Patent
Payzer et al.

(10) Patent No.: US 11,014,010 B2
(45) Date of Patent: May 25, 2021

(54) STATE MANAGEMENT OF DYNAMIC PROPERTIES

(71) Applicant: Microsoft Technology Licensing, LLC, Redmond, WA (US)

(72) Inventors: Gershom L. Payzer, Redmond, WA (US); Richard Michael Fox, Berlin (DE); Gregory M. Smith, Seattle, WA (US); Connor Peet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 533 days.

(21) Appl. No.: 15/865,174

(22) Filed: Jan. 8, 2018

(65) Prior Publication Data

US 2019/0118098 A1    Apr. 25, 2019

Related U.S. Application Data

(60) Provisional application No. 62/575,095, filed on Oct. 20, 2017.

(51) Int. Cl.
| | |
|---|---|
| *A63F 13/86* | (2014.01) |
| *H04N 21/478* | (2011.01) |
| *G07F 17/32* | (2006.01) |
| *A63F 13/30* | (2014.01) |
| *A63F 13/65* | (2014.01) |
| *A63F 13/355* | (2014.01) |
| *A63F 13/77* | (2014.01) |
| *H04N 21/43* | (2011.01) |

(52) U.S. Cl.
CPC ............. *A63F 13/86* (2014.09); *A63F 13/30* (2014.09); *A63F 13/355* (2014.09); *A63F 13/65* (2014.09); *A63F 13/77* (2014.09); *G07F 17/3244* (2013.01); *H04N 21/4307* (2013.01); *H04N 21/4781* (2013.01)

(58) Field of Classification Search
CPC ........ A63F 13/86; A63F 13/30; A63F 13/355; A63F 13/65; A63F 13/77; G07F 17/3244; H04N 21/4307; H04N 21/4781
See application file for complete search history.

(56) References Cited

U.S. PATENT DOCUMENTS 7,458,894 B2 * 12/2008 Danieli .................. A63F 13/12
463/42
8,221,220 B2    7/2012 Ackley et al.
(Continued)

OTHER PUBLICATIONS

Dollard, Morgan, "Android Developers Blog", Retrieved from: <<https://android-developers.googleblog.com/2016/03/grow-your-games-business-on-google-play.html>>, Mar. 14, 2016, 5 Pages.
(Continued)

*Primary Examiner* — William H McCulloch, Jr.
*Assistant Examiner* — Ankit B Doshi
(74) *Attorney, Agent, or Firm* — Alleman Hall Creasman & Tuttle LLP

(57) ABSTRACT

A broadcast computing device broadcasts an audiovisual stream via a computer network to a plurality of viewing computers. The broadcast computing device stores production information according to a hybrid data type. The broadcasting program receives a request to update the stored production information from a viewing computer, and updates the production information.

20 Claims, 14 Drawing Sheets

(56) References Cited

U.S. PATENT DOCUMENTS

| | | | |
|---|---|---|---|
| 8,290,920 B2 | 10/2012 | Mahajan et al. | |
| 9,257,006 B2 | 2/2016 | Gagner et al. | |
| 9,498,715 B2 | 11/2016 | Kruglick | |
| 9,636,590 B2 | 5/2017 | Knutsson et al. | |
| 10,129,579 B2 * | 11/2018 | Meredith | H04N 21/23439 |
| 2003/0038805 A1 * | 2/2003 | Wong | A63F 13/12 |
| | | | 345/473 |
| 2010/0306813 A1 * | 12/2010 | Perry | H04L 67/18 |
| | | | 725/114 |
| 2011/0107220 A1 * | 5/2011 | Perlman | H04N 19/107 |
| | | | 715/720 |
| 2015/0251095 A1 * | 9/2015 | Perrin | G06F 9/452 |
| | | | 463/31 |
| 2016/0067612 A1 | 3/2016 | Ntoulas et al. | |
| 2016/0158652 A1 | 6/2016 | Wright et al. | |
| 2017/0113135 A1 | 4/2017 | Marr et al. | |

OTHER PUBLICATIONS

"Interactive Reference Documentation", Retrieved from: <<https://dev.mixer.com/reference/interactive/index.html>>, Retrieved on: Nov. 24, 2017, 16 Pages.

"Interactive 2 Protocol Specification", Retrieved from: <<https://dev.mixer.com/reference/interactive/protocol/protocol.pdf>>, Retrieved on: Nov. 24, 2017, pp. 1-49.

"Mixer—Interactive Livestreaming", Retrieved from: <<https://mixer.com/?sandbox=xdks.1>>, Retrieved on: Nov. 24, 2017, 2 Pages.

"Performance—interactive-cpp", Retrieved from: <<https://github.com/mixer/interactive-cpp/wiki/Performance>>, Aug. 29, 2017, 2 Pages.

"Performance—interactive-unity-plugin", Retrieved from: <<https://github.com/mixer/interactive-unity-plugin/wiki/Performance>>, Aug. 29, 2017, 2 Pages.

* cited by examiner

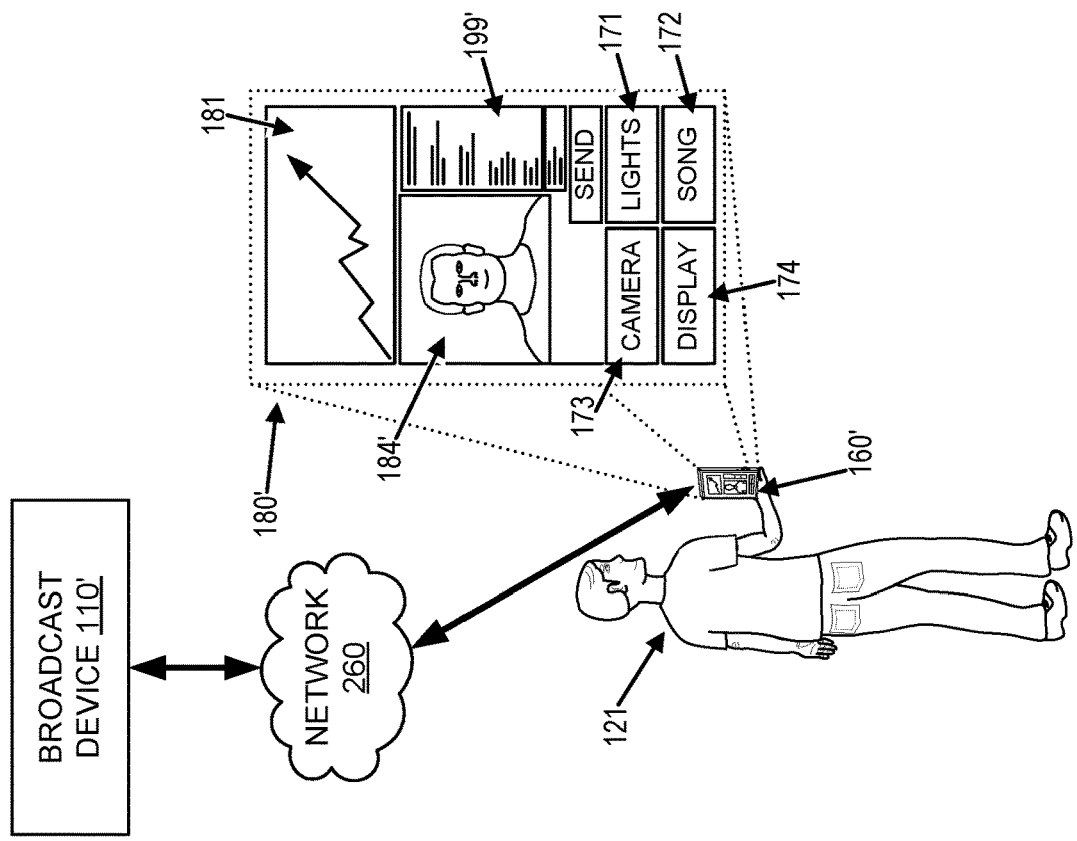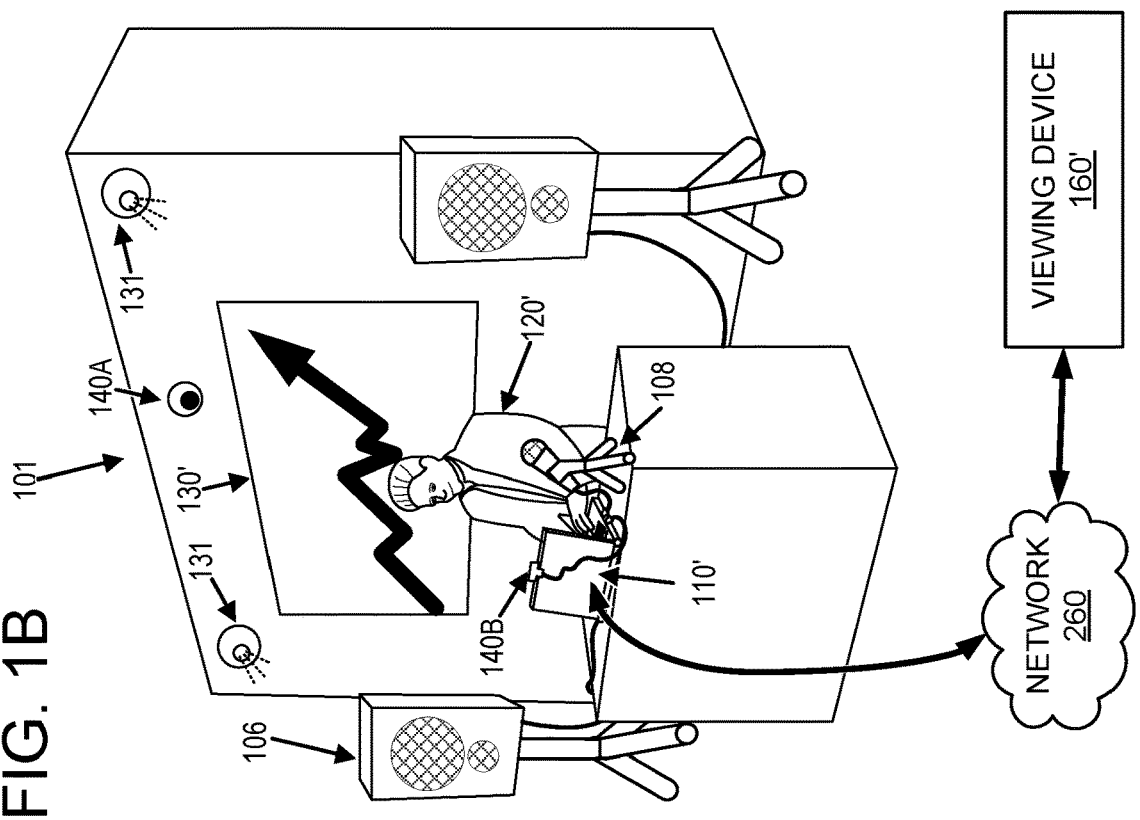

FIG. 3C

```
{
    "name"      : "Bill",
    "hitPoints" : 80,
    "teamID"    : 2,
    "weapon"    : "sword",
    "pet"       : {
        "petName" : "Fido",
        "petType" : "dog"
    }
}
```

FIG. 3D

```
{
    "hitPoints" : 86,
    "teamID"    : 3,
    "weapon"    : "sword"
}
```

```
         interface "GameCharacter" {
343A ──→    name      : text;      ←── 344A
343B ──→    hitPoints : number;    ←── 344B
343C ──→    teamID    : number;    ←── 344C
         }
```

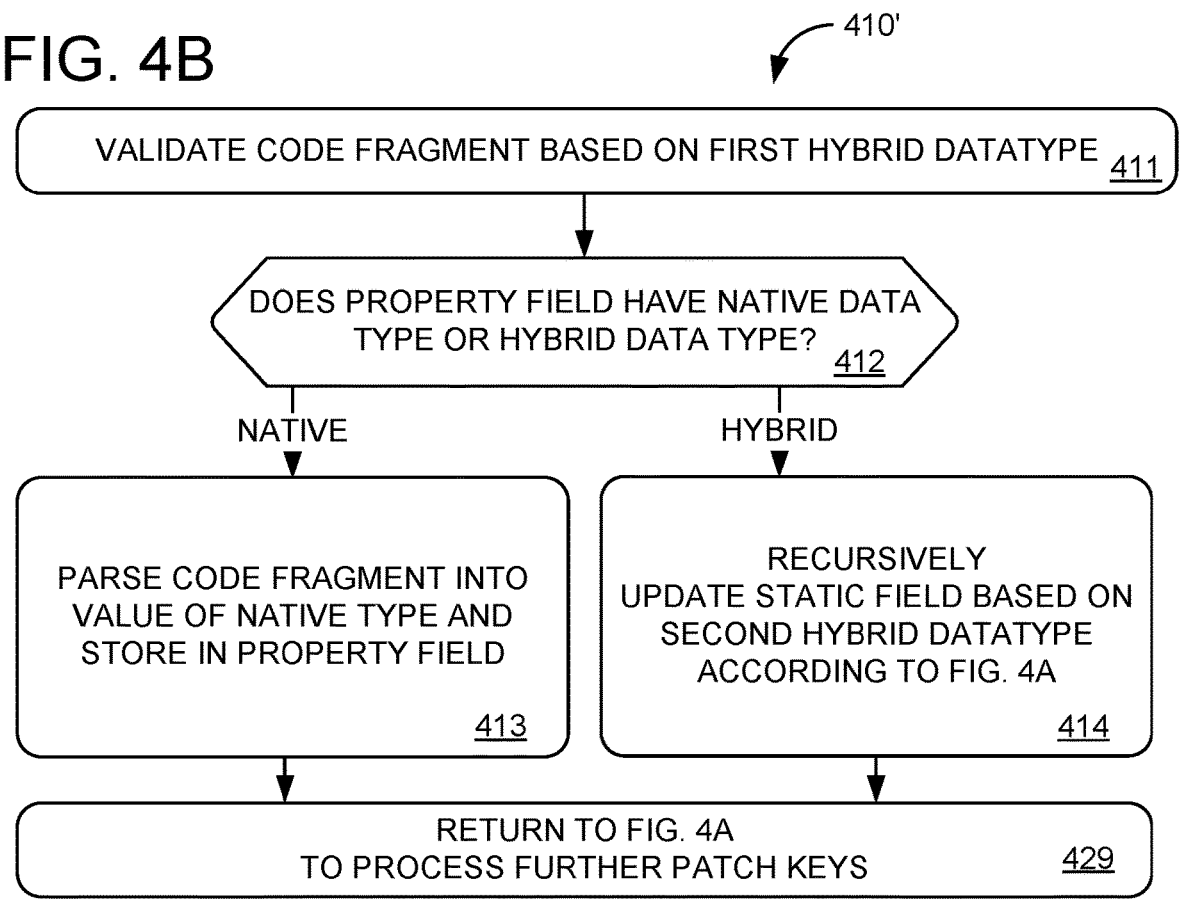

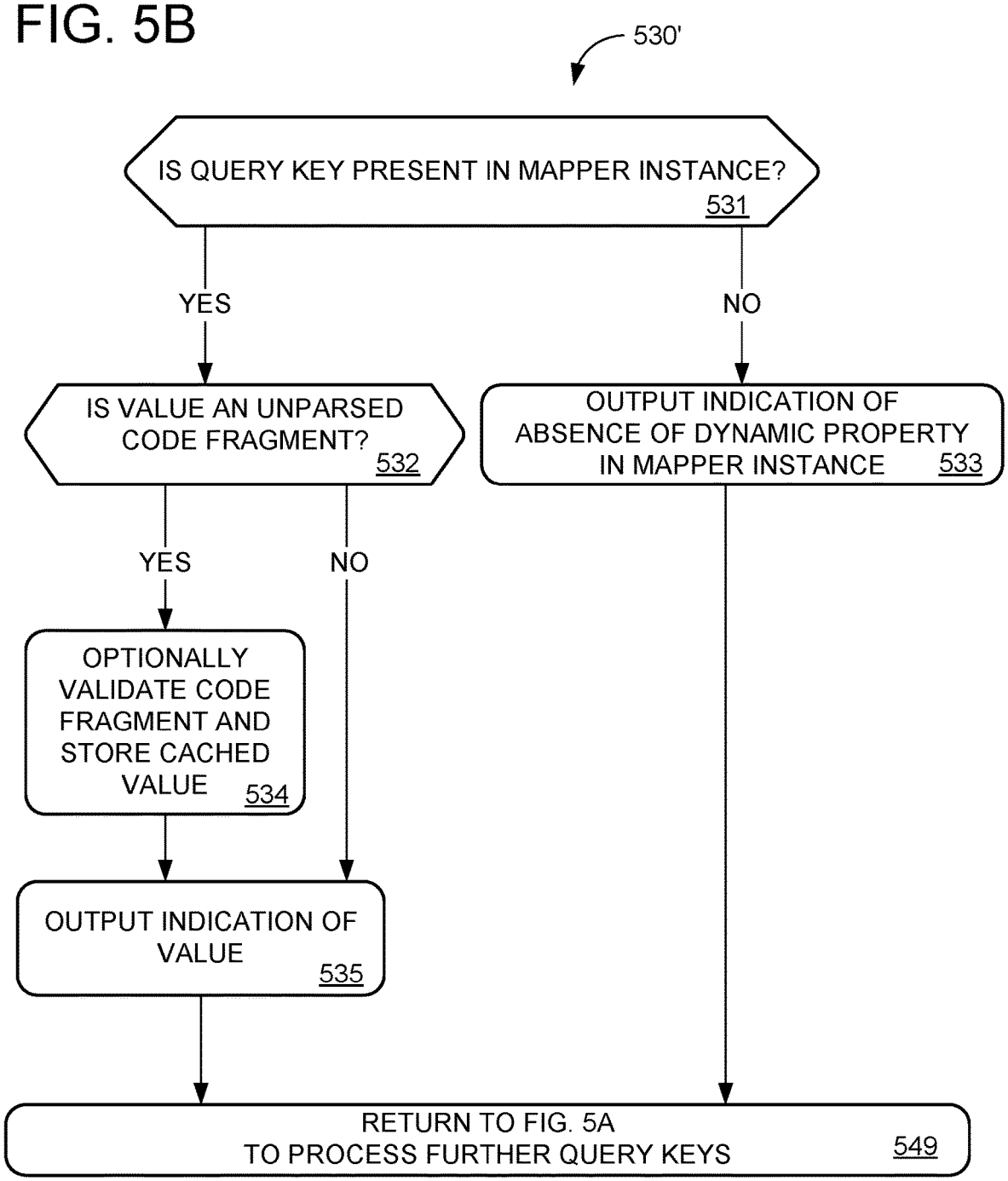

STATE MANAGEMENT OF DYNAMIC PROPERTIES

CROSS REFERENCE TO RELATED APPLICATIONS

This application claims priority to U.S. Provisional Patent Application Ser. No. 62/575,095, filed Oct. 20, 2017, the entirety of which is hereby incorporated herein by reference for all purposes.

BACKGROUND

Audiovisual streaming allows a user to broadcast audiovisual content to an audience of viewers via information networks, such as the Internet. Any sort of audiovisual content may be broadcast by a user to an audience of viewers. For example, a user may stream gameplay of a video game, user-generated programming (e.g., live shows, podcasts), electronic sports (E-sports), and other events (e.g., panels, press conferences, and show floor activities).

BRIEF DESCRIPTION OF THE DRAWINGS

FIGS. 1A-1D depict example use-scenarios in which a broadcast computing device broadcasts an interactive experience to a remote device.

FIGS. 3C and 3D show example code fragments in a shared serialized format.

FIG. 3E illustrates an example interface definition code fragment.

FIG. 4B shows a method to patch a static property.

FIG. 5B shows a method to output a dynamic property.

DETAILED DESCRIPTION

Interactive audiovisual streaming allows a broadcaster and a plurality of viewers to participate in a shared experience. In exemplary scenarios, the broadcaster provides an audiovisual stream including content which may be of interest to the plurality of viewers, and sends the audiovisual stream over a network to viewing devices of the plurality of viewers. As examples, the audiovisual stream may include gameplay of one or more players playing a video game; live audio and video of a live commentator, moderator, and/or performer; or an electronic sports (e-sports) stream including gameplay of one or more players playing a competitive, multiplayer video game, optionally in conjunction with live audio and video of a live commentator of the multiplayer video game.

In any of these or other examples, developers may use production software to design a custom control element that can be associated with the audiovisual stream. Data representing the custom control element can be sent to the viewing devices along with the audiovisual stream. Accordingly, the viewing devices may interpret such data in order to include the custom control element in a graphical user interface (GUI) of a media player program being used to view the audiovisual stream.

The plurality of viewers may interact with the broadcaster by using the custom control elements of the media player GUI to send data describing an interaction back to the broadcast computing device. The data may be used to modify the interactive audiovisual stream in any suitable fashion, as will be described in examples below, with reference to FIGS. 1A-1D. To facilitate such interactions, source and remote clients of the video game may share various state data (e.g., custom control data and interaction data) in a shared serialized format.

Sharing of data in this manner may be complicated by a client extending the shared serialized format to share additional state data including dynamic properties, which may not have been contemplated when the shared serialized format was designed. Accordingly, as described below, a backend for state management of dynamic properties may be implemented as part of a broadcasting platform usable by developers of streamed interactive experiences, relieving content developers (e.g., a video game developer) of the burden of developing the interactive broadcast platform themselves.

Figure 1A:
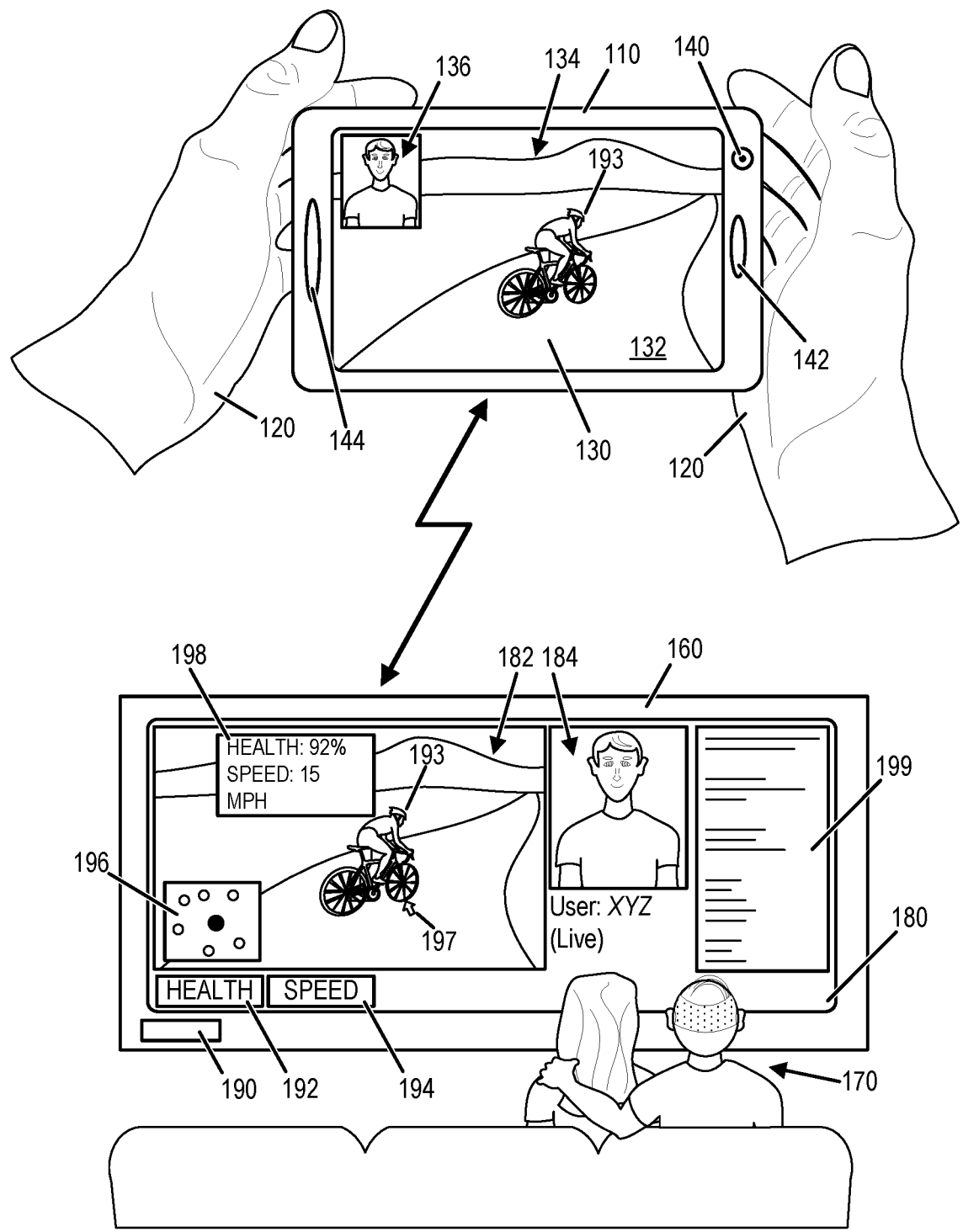

For example, FIG. 1A shows a user 120 playing a video game on broadcast computing device 110 and broadcasting content to remote device 160 for presentation to remote viewers 170. Graphical display device 180 of remote device 160 shows various multimedia content, including game video stream 182, player camera stream 184, graphical user interface (GUI) buttons including a health control 192 and speed control 194, minimap 196, popup 198, and chat interface 199.

Broadcast computing device 110 may further include an audio speaker 142 and an audio microphone 144. Audio of the game program being played by user 120 may be output locally by audio speaker 142. Audio generated by user 120 and/or the user's surroundings, such as the user's spoken commentary, may be captured by microphone 144.

Broadcast computing device 110 may be a mobile computing device, as depicted in FIG. 1A. It will be appreciated that streaming may be sent from other types of computing devices having different user input, processing and storage capabilities, as will be described below with reference to FIGS. 1B-1D.

Audio representations of game audio of the game program and microphone audio captured by microphone 144 may be streamed by broadcast computing device 110 to remote device 160 for presentation to remote viewers 170. Remote device 160 may output the audio of the game program and/or the audio captured remotely by microphone 144 via an audio speaker 190. Hence, remote viewers 170 may listen to game audio and microphone audio streamed from broadcast computing device 110. Microphone audio capturing spoken commentary of user 120 may be referred to as game player audio.

One type of event that can be streamed to viewers is a broadcaster's participation in a video game. For example, viewers may be able to interact with user 120. For example, remote viewers 170 may be able to send messages to user 120 via chat interface 199 or via audio received via a microphone 144 of remote device 160 and output via a speaker of broadcast computing device 110. Beyond mere observation and communication with the broadcaster, a developer of the video game may wish to enable greater levels of interaction, e.g., viewer input to affect the video game and the broadcaster's experience therein.

Broadcast computing device 110, operated by user 120, includes a graphical display device 130 that is presenting a graphical user interface (GUI) 132. GUI 132 may include one or more interfaces that form components of the GUI. For example, GUI 132 may include a game interface 134 for a game program (i.e., a video game) being played by user 120 at broadcast computing device 110. Game interface 134 may correspond to a game view presented during gameplay to user 120 as a game player of the game program. Another interface component of GUI 132 at broadcast computing device 110 may include a camera view interface 136, which in this example includes the camera view captured by camera 140. Camera view interface 136 enables user 120 to see the camera view captured by camera 140, thereby assisting user 120 to align the camera view with a desired subject. Camera view interface 136 may be omitted from GUI 132 in at least some implementations.

Beyond facilitating the stream broadcasted by user 120, remote device 160 may enable remote viewers 170 to participate in the content being streamed. Graphical display device 180 may display auxiliary content related to game interface 134 and not present in game interface 134 or the corresponding game video stream 182, such as a minimap 196. Via graphical display device 180, remote device 160 may output various interactive controls selectable by remote viewers 170 to affect the game program played by user 120. As examples, FIG. 1A shows the display of a health control 192 selectable to increase the health of a character (e.g., cyclist 193) of the game program controlled by user 120, and a speed control 194 selectable to increase the speed of the character. As another example of a control enabling remote viewer participation in the stream, FIG. 1A also shows the output of the minimap 196 in which the position of the character controller by user 120, as well as the positions of various non-player characters (NPCs), is displayed. Via minimap 196, remote viewers 170 may control NPC positions, issue attacks against NPCs, or supply input affecting NPCs in any other suitable manner. In this or other examples, remote viewers 170 may directly control the position of the player character, thereby directly influencing the game actions being executed by the main user 120 of the video game.

Remote device 160 may output other types of interactive controls. As another example, FIG. 1A shows the display of a popup 198 that lists the health and speed of the character controlled by user 120. The placement of a cursor 197, displayed in graphical display device 180 and controlled by remote viewers 170, over the character may cause remote device 160 to query broadcast computing device 110 for these variables and thereby effect the display of popup 198, for example.

In view of the above, the selection of the interactive controls described herein, and the events resulting from their selection, may be reflected on the broadcaster side (e.g., in the game program audio and/or game program video) and/or on the viewer side (e.g., in the stream representation of the game program audio and/or stream representation of the game program video).

In addition to or in lieu of streaming representations of game audio and game video of the game program, a representation of an internal game state of the game program may additionally be sent by broadcast computing device 110 to remote device 160. Remote device 160 may interpret the representation of the internal game state in order to present content to remote viewers 170. For example, remote device 160 may use the internal game state to determine audiovisual output to be rendered and output at remote device 160. In this way, remote device 160 may show substantially similar audiovisual content to broadcast computing device 110, without requiring receiving a pre-rendered audio and/or visual stream, which may require a large bandwidth to stream over a network. Alternately, remote device 160 may show an audiovisual stream provided by broadcast computing device 110, augmented with additional information derived from the game state and not shown at broadcast computing device 110. Broadcast computing device 110 may send data specifying one or more custom control elements to remote device 160. Upon receiving such data, remote device 160 may present a custom GUI interface to remote viewers 170, including one or more control elements related to the game program running on broadcast computing device 110.

Remote viewers 170 may interact with an interactive control and thereby participate in the game program executed on broadcast computing device 110 via any suitable input mechanism. For example, an input device operatively coupled to remote device 160 may be used to supply input, and may be configured as a handheld controller, mouse, remote, or other peripheral. Other examples include the use of an imaging device to receive gestural input and/or gaze input. Further, while shown in FIG. 1A in the form of a large-format television, remote device 160 may assume any suitable form. As another example, remote device 160 may be configured as a mobile computing device with an integrated touch sensor with which user input is received for participating in the game program.

In order to present the game video stream 182 and the interactive controls described above, remote device 160 may receive other types of data from broadcast computing device 110 and/or an intermediate server system. In particular, broadcast computing device 110 may transmit state data regarding the state of the game program, such as various variables regarding game program characters, items, levels, etc. For example, state data may include the position of the character controlled by user 120 and those of various NPCs around the character, which enables the display of minimap 196 and the representation therein of such character positions, and the health and speed variables associated with the player-controlled character, which enables the display of these variables in popup 198.

FIG. 1B shows another exemplary use-scenario for an interactive streaming system in which a broadcast computing device 110' presents a video stream including a user interface 180' with associated interactive controls to one or more remote devices, such as remote device 160' as depicted in FIG. 1C. In particular, FIG. 1B depicts an example use-scenario in which a live event conducted in a use environment 101 is broadcasted for interactive participation. FIG. 1B may represent any suitable live event, such as a presentation conducted in a convention booth, a concert or other performance, etc. The live event is conducted at least in part by a user 120', which may produce aspects of the live event via a broadcast computing device 110', shown in the form of a laptop computer. As such, user 120' and broadcast computing device 110' may be referred to as a "producer" and "producer computer", respectively, and a program utilized by the user executing on the broadcast computing device to produce and/or broadcast the live event may be referred to as a "broadcast program" and/or "production program".

User 120' may control aspects of the live event via one or more devices in use environment 101 that are communicatively coupled to broadcast computing device 110' via a suitable network connection. As examples, such devices may include speakers 106 (e.g., used to output music or other audio in use environment 101), a microphone 108 (e.g., used to receive speech uttered by user 120' for output to the speakers and/or for broadcasting to remote viewers), a display 130' (e.g., used to present graphical output viewable by other users in the use environment), and lights 131 (e.g., used to vary proximate lighting conditions, including but not limited to brightness, color, and/or pattern). FIG. 1B also depicts the inclusion of cameras 140A and 140B in environment 101. Camera 140A may produce a camera view of the overall environment 101, while camera 140B may be configured as a webcam coupled to broadcast computing device 110', and may produce a camera view of user 120' when positioned in front of camera 140B. Each camera view may be selectively presented locally via display 130' and/or broadcast for remote viewing. Broadcast computing device 110" is additionally communicatively coupled, via communication network 260, to other computing devices including one or more local or remote viewing devices, such as viewing device 160'. Communication network 260 may include any suitable type of communication network. For example, communication network 260 may include a local area network, a wide area network, and/or another type of network.

Aspects of the live event may be affected at least in part by local and/or remote participants in the live event other than user 120'. As an example, FIG. 1C depicts a user 121 interacting with a viewing device 160', shown in the form of a smartphone, with which this user may affect aspects of the live event. User 121 may be local to use environment 101 (e.g., proximate to the booth occupied by user 120' or generally in the vicinity thereof) or remotely located in another environment. FIG. 1C also depicts a view of a user interface 180' that may be presented on a display of viewing device 160'. User interface 180' may include various interactive controls selectable to affect aspects of the live event. Further, user interface 180' may be presented by a viewer program executing on viewing device 160'.

In the depicted example, user interface 180' includes an interactive control 171 selectable to change the output of lights 131 (e.g., color, frequency, pattern), an interactive control 172 selectable to choose a song for playback in environment 101 via speakers 106, an interactive control 173 selectable to change the camera views(s) being presented via display 130' and/or those being remotely streamed, and an interactive control 174 selectable to generally vary the graphical output presented via display 130'. In some examples, an interactive control may be configured to cast a vote for an option relating to that interactive control, rather than directly effecting a corresponding change in environment 101. For example, selection of interactive control 172 may enable user 121 to cast a vote for a subsequent song to be played in environment 101. An interactive control may be configured to cast votes in this manner for scenarios in which two or more local and/or remote users other than user 120' participate in the live event conducted in environment 101. In this example, upon selection of an interactive control element to cast a particular vote, viewing device 160' sends data describing the particular cast vote to broadcast device 120'. Accordingly, broadcast device 120' receives a plurality of votes (from viewing device 160' and from other viewing devices of other users) and counts the votes received over a designated time window. Broadcast device 120' may report the result of the tally or perform any suitable action based on the result, enabling mass participation in the live event directed by which options garner the most votes.

Changes to the presentation of the live event in environment 101 effected by interactive control selection in user interface 180', and aspects of the live event in general, may be reflected on viewing device 160'. As examples, songs played in environment 101 may be output via one or more speakers of viewing device 160', output of display 130' in environment 101 may be presented in a window 181 of user interface 180', one or both camera feeds produced by cameras 140A and 140B may be presented in the same or different window, and output of lights 131 (e.g., as captured in the camera feed produced by camera 140B) may be presented in the same or different window. User interface 180' may include alternative or additional graphical content and/or controls. As further examples, FIG. 1C depicts a camera feed 184' produced by camera 140B of broadcast device 110' that captures user 120', and which may be broadcast to other local and/or remote participants in the live event and/or to viewing device 110', as well as a chat interface 199' operable to receive text input that can be shared with local and/or remote participants, and/or viewing device 110'.

Figure 1D:
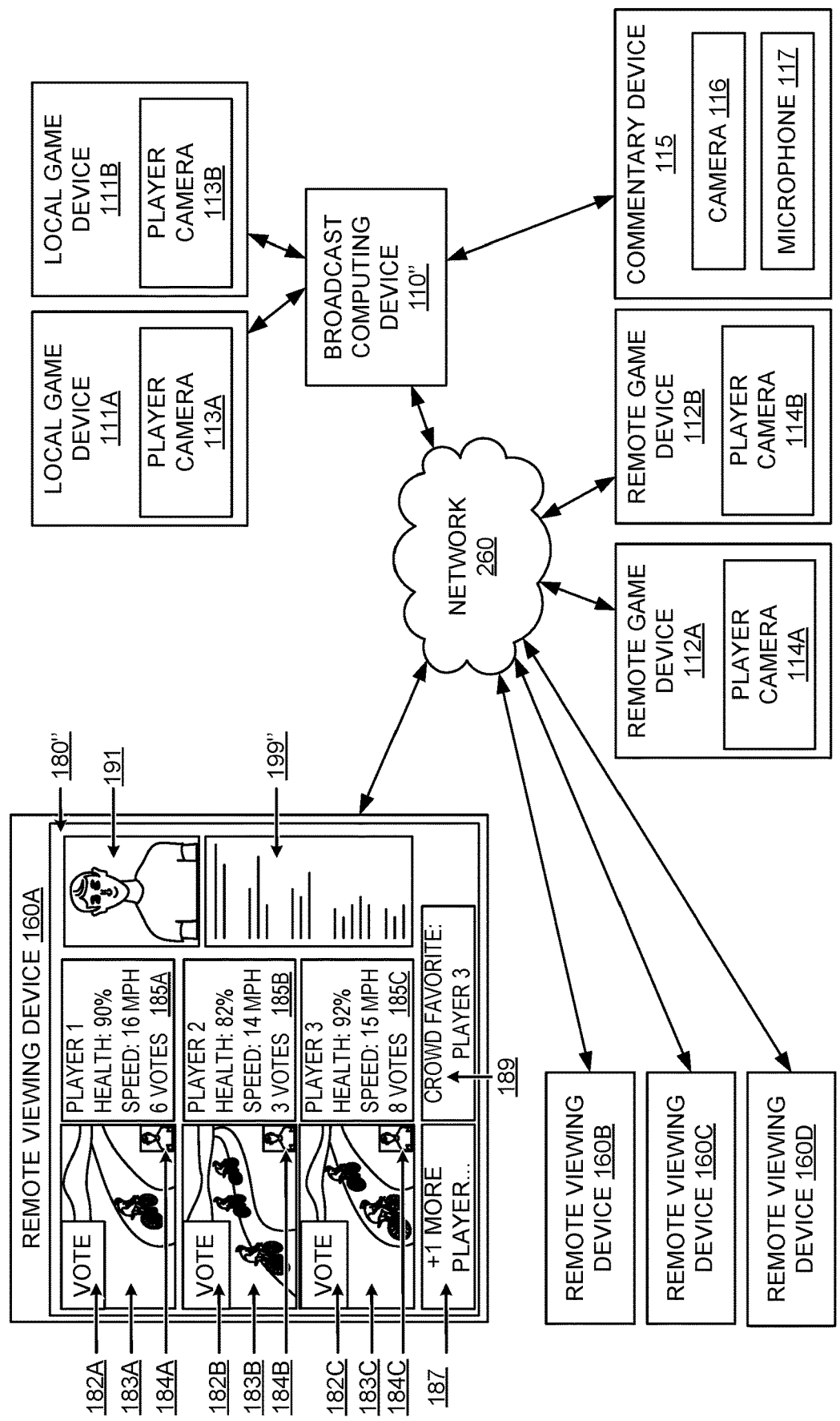

FIG. 1D shows another exemplary use-scenario for an interactive streaming system in which a broadcast computing device 110" executes a broadcasting program, and presents a video stream with associated interactive controls to one or more remote devices, such as remote viewing devices 160A, 160B, 160C, and 160D. In this example, graphical display 180" of remote viewing device 160A depicts an interactive broadcast of an e-sports event including streaming audiovisual data and associated interactive controls. A producer of the e-sports event may use broadcast computing device 110" to facilitate multiplayer game play of a multiplayer game by one or more players. Furthermore, the producer of the e-sports event may use a production software tool of broadcast computing device 110" to render a video stream with associated interactive controls, and to broadcast the video stream and associated interactive controls to one or more viewing devices. The video stream may additionally include a commentary stream produced by a commentator of the multiplayer video game using a commentary device 115.

Broadcast computing device 110" is communicatively coupled to commentary device 115 and to local game devices 111A and 111B, in any suitable fashion, for example, via a wired local area network. Broadcast computing device 110" is additionally communicatively coupled, via communication network 260, to other computing devices including remote game devices 112A and 112B, and remote viewing devices 160A, 160B, 160C, and 160D. Remote devices 160A, 160B, 160C, and 160D may be any suitable computing devices.

Broadcast computing device 110" may receive streaming audiovisual content, game state data, and any other suitable data from local game devices 111A and 111B, and from remote game devices 112A and 112B. In the depicted example, broadcast computing device 110" receives player input data of a multiplayer video game being played by users of local game devices 111A and 111B and remote game devices 112A and 112B. Additionally, broadcast computing device 110" may receive streaming audiovisual data from one or more cameras of the local and remote game devices, such as player camera 113A of local game device 111A, player camera 113B of local game device 111B, player camera 114A of remote game device 112A, and/or player camera 114B of remote game device 112B.

Broadcast computing device 110" may additionally receive streaming audiovisual content from commentary device 115. Such streaming audiovisual content may include data received from a camera 116 and/or a microphone 117 of commentary device 115. For example, commentary device 115 may be a computing device of a play-by-play commentator and/or analyst covering the e-sports event, and the data received from camera 116 and microphone 117 may be game commentary of the multiplayer video game (e.g., including analysis of the game so far, and predictions of a possible outcome). In other examples, commentary device 115 may collect streaming audiovisual content from a plurality of commentators (e.g., a panel of commentators) who may be local or remote to commentary device 115. In the depicted example, broadcast computing device 110" is configured to act as a game server of the multiplayer video game, including interpreting player inputs from the local and remote game devices, computing an updated game state, and sending a computer-readable description of the updated game state to the local and remote game devices. Broadcast computing device 110" may be a device administrated by an organizer of a competitive e-sports event. By computing each update to the game state, broadcast computing device 110" determines each subsequent game state and a final result of the multiplayer video game. Because broadcast computing device 110" is administered by the organizer of the competitive e-sports event, broadcast computing device 110" may act as a fair "referee" for a competitive game. In this way, players of the multiplayer video game may be prevented from cheating or abusing unintended behavior of a client of the multiplayer video game.

In addition, broadcast computing device 110" may render one or more rendered views of the updated game state to produce an update to an audiovisual stream of the multiplayer video game. Broadcast computing device 110" may additionally determine statistics of the multiplayer game or any other suitable analysis of the updated game state. The broadcasting program of broadcast computing device 110" may composite together any suitable audiovisual data for broadcast in an e-sports stream. For example, as depicted in graphical display 180" of remote viewing device 160A, the composited audiovisual data may include: 1) the one or more rendered views of the updated game state (such as rendered view of a first player, 183A; rendered view of a second player 183B, and rendered view of a third player 183C); 2) the one or more audiovisual streams depicting data received from player cameras (such as player camera stream 184A depicting the first player based on data received from player camera 113A of the first player's computer, or such as player camera stream 184B of the second player, or player camera stream 184C of the third player); 3) a visual presentation of statistics and/or analysis (such as player statistics 185A, 185B, and 185C); 4) the audiovisual stream received from commentary device 115 (such as commentary stream 191 depicting a commentator of the multiplayer video game).

Broadcast computing device 110" may additionally send data specifying one or more custom control elements to the remote viewing devices, which upon reception of the data may present a custom GUI interface to the remote viewers. Broadcast computing device 110" may send any suitable custom control elements to the remote devices. Furthermore, broadcast computing device 110" may send different custom control elements to different subsets of the remote devices, the custom control elements associated with features of the audiovisual stream. For example, graphical display 180" of remote viewing device 160A depicts custom controls including voting buttons (such as voting buttons 182A, 182B, and 182C) allowing a viewer to engage in an online vote which may determine a future state of the audiovisual stream and/or interactive controls, as described above with reference to FIGS. 1B-1C. For example, graphical display 180" shows a result of a recent or ongoing vote in vote result indicator 189, which depicts a crowd favorite, or as described by the voting statistics included in in player statistics 185A, 185B, and 185C). The custom controls also include chat interface 199", which may allow a viewer to engage in online discussions by viewing past discussions in a chat log and contributing new commentary by submitting textual messages to be logged in the chat log. The custom controls further include a button 187 to show an additional player of the multiplayer game, enabling a viewer to see all four players of the multiplayer game even though by default the audiovisual stream only includes a view of three of the four players. The custom controls may further include any other suitable control related to observing and/or interacting with the audiovisual stream. For example, a viewer may be able to select one of the depictions of player statistics (e.g., player statistics 185A) to see additional detailed statistics of the player, which may include statistics related to the multiplayer game being played as well as other statistics of the player, such as a record of previous games. Custom controls may also facilitate interacting with a producer and/or commentator of the e-sports stream, for example, by sending a message (such as a question for the commentator) to broadcast computing device 110" and/or to commentary device 115 to be viewed by the producer and/or commentator.

In this or other examples, the custom controls sent to the remote devices may include any other custom control (e.g., those described above with regard to FIGS. 1A-1C). For example, the custom controls may include a control to choose a next audio track to be played in a queue of audio tracks associated with the e-sports stream. In a competitive e-sports event, it may not be appropriate to allow custom controls to directly affect gameplay of the multiplayer video game (so that the gameplay remains competitive and fair for the players). Broadcast computing device 110" may provide custom controls that offer any level of indirect or direct influence over subsequent content of the e-sports stream.

Broadcast computing device 110" may also provide custom controls to facilitate betting (e.g., by placing wagers based on predicting an outcome of the e-sports event and/or sub-events within the e-sports event). Broadcast computing device 110" may determine the outcome of each placed wager, according to received computer-readable descriptions associated with the custom controls and according to the game state of the multiplayer game. Thus, broadcast computing device 110" may act as a fair "referee" or "bookkeeper," allowing a viewer to place bets with other viewers and/or the house, with confidence that the placed bet will be correctly executed based on the outcome of the e-sports event.

Remote devices 160B, 160C, and 160D may also include graphical displays which may output similar or identical content to the content shown in graphical display 180". Content output to a particular remote device may vary based at least on a user preference, nationalization settings, parental control settings, and/or any other suitable configuration of the particular remote device.

Implementing a streaming platform capable of supporting viewer participation beyond observation, as described with regard to the use-scenarios with reference to FIGS. 1A-1D above, may present an increased technical burden to a broadcast program developer. The increased technical burden may arise from an inability to rely on various assumptions associated with traditional broadcasting platforms (e.g., multiplayer video game broadcasting platforms). For example, the hardware used by broadcasters and viewers may differ significantly in capability and/or configuration. Further, the software configurations between broadcaster and viewer devices may differ significantly. For example, a viewer may participate in a stream via an internet browser, whereas a broadcaster may play a video game that executes a proprietary video game engine.

Data that is suited for the configuration of one device can be adapted to the configuration of a differently configured device to enable cross-platform viewer participation in streamed interactive experiences, such as a video game program, a live event, and/or an e-sports event as described above. In particular, state data of the broadcast program and/or input from the remote device that affects the broadcast program or causes a request for state data, may be processed to facilitate cross-platform viewer participation.

A backend service may be configured to facilitate interaction between significantly different broadcaster/viewer hardware and/or software. The backend service may serialize data arising at a broadcast or remote client (e.g., from user input), converting the data from a generated native representation used by a client into a generated serialized representation. The backend service may accordingly deserialize a received serialized representation, converting from the received serialized representation to a received native representation. Such a backend service may be implemented for each hardware and/or software configuration for which the developer wishes to provide a broadcast or remote client. Accordingly, each backend service may convert data to/from a native format based on the hardware and/or software configuration from/to a shared serialized format.

A variety of different shared serialized formats may be used, including an encoding using binary and/or plain-text data encodings (e.g., comma-separated value (CSV), extensible markup language (XML)). A data exchange language (e.g., JavaScript Object Notation (JSON)) may be used as a basis for the shared serialized format, in order to encode various forms of structured data according to the needs of the interactive experience. In some cases, the native format and the shared serialized format may substantially coincide. For example, a client implemented for an internet browser using JavaScript methods may use JSON as the native format, in an interactive system including clients using JSON to encode the shared serialized format. In other cases, the native format may be an efficient binary format optimized for a hardware and/or software configuration, e.g., a C++ object having data fields represented as native C++ values. Such native formats may be optimized for latency of data access, memory usage requirements, or any other suitable way according to the needs of the interactive experience and the capabilities of the hardware and/or software configuration.

While a backend service for exchanging data may facilitate the implementation of a streaming platform capable of supporting viewer participation, implementing such a backend service may still present a substantial technical burden if the different clients require the exchange of different sets of dynamic properties not contemplated when developing a client program. For example, a web client for viewing a video game broadcast may exchange chat data defining a log of chat messages exchanged via a chat interface of the web client, while a broadcast client comprising a video game being played by a broadcasting user may ignore such chat data. In another example, a team of developers may be iteratively developing versions of a video game, with part of the team developing a broadcast client implemented in C++ and another part of the team developing a web client comprising interactive controls via HTML and CSS that execute JavaScript methods when selected. The two parts of the team may each wish to extend the shared serialized format used by both the broadcast client and the web client to include a new dynamic property relating to a new feature of the video game. However, such extension of the shared serialized format in a new version of the web client may cause an incompatibility with a version of the broadcast client, and vice versa.

To further facilitate such extension of the shared format in a manner compatible with various clients, a backend service for state management of dynamic properties may be implemented as a platform usable by developers of a video game, relieving the developers of the burden of developing the platform themselves. Such a backend service may enable developers to design diverse broadcast and remote clients of the video game which exchange various data, including audio visual data, chat data, and other state data as described with reference to FIG. 2. Such a backend service for state management of dynamic properties may include functions for instantiating, querying, and updating data in a hybrid data format suitable for dynamic update based on data in a shared serialized format (e.g., methods 400 and 500 as described with reference FIGS. 3-5). A developer may use one or more developer computers to generate code executable to perform the methods of the backend service (e.g., with method 600 as described with reference to FIG. 6).

Figure 2:
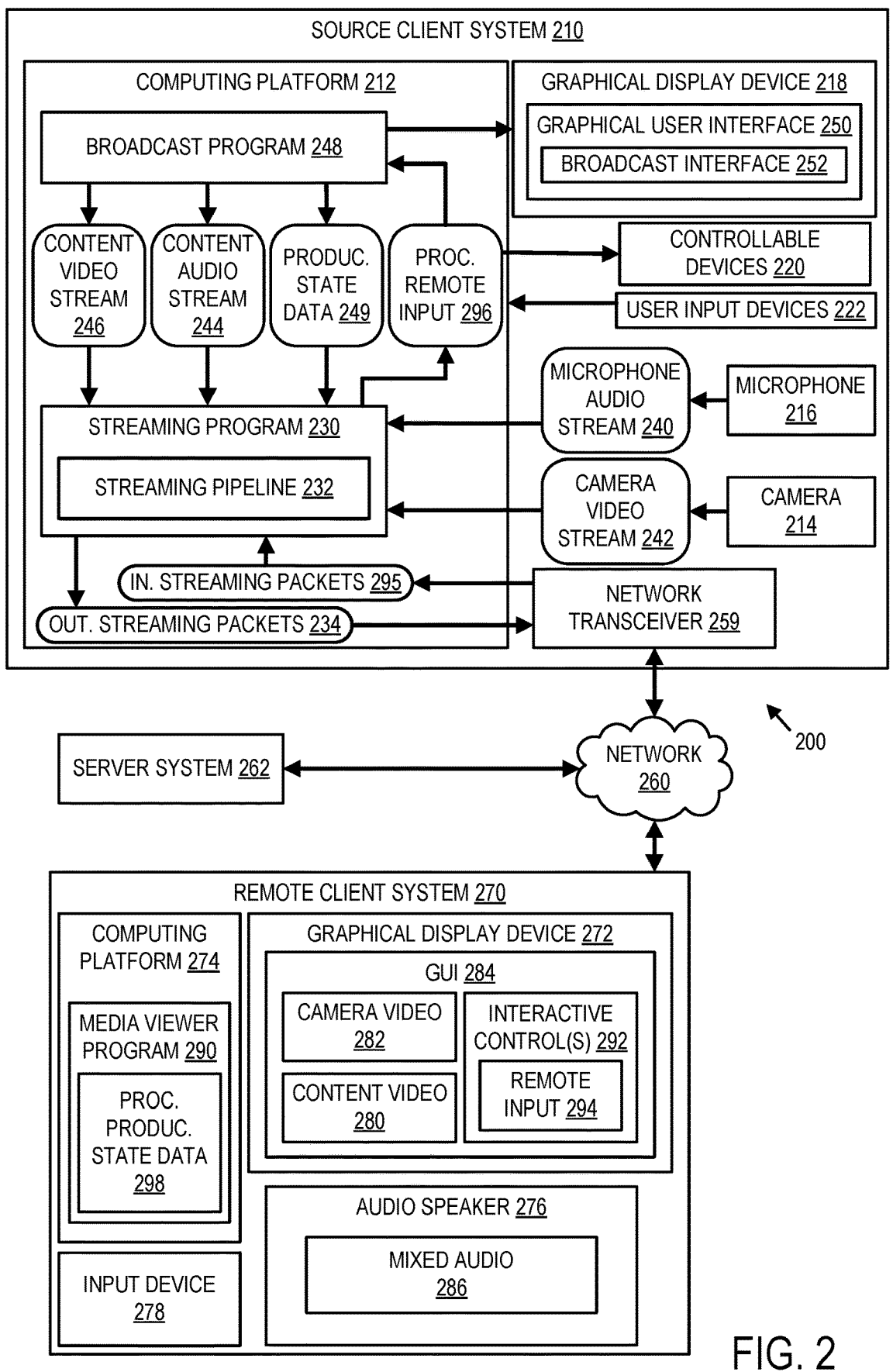
FIG. 2 schematically shows an example computing environment in which a broadcast computing system provides audiovisual streaming in addition to interactive features.

FIG. 2 is a schematic diagram depicting an example audiovisual streaming environment 200. A source client system 210 of audiovisual streaming environment 200 includes a computing platform 212, a camera 214, a microphone 216, graphical display device 218, one or more controllable devices 220 (e.g., an audio speaker), and one or more user input devices 222. Broadcast computing devices 110, 110', and 110" of FIG. 1A-1D are non-limiting examples of source client system 210. However, source client system 210 may take other suitable forms, including computing devices that also incorporate components 212, 214, 216, 218, 220, 222, etc. into a single integrated enclosure, and computing systems that incorporate these components into multiple devices having separate enclosures. As source client system 210 may facilitate the streaming or broadcast of audiovisual content, the source client system may be referred to as a broadcast computing device.

Computing platform 212 may execute or otherwise implement a broadcast/streaming program 230 that receives audio and/or video from multiple sources, processes the audio and/or video through a streaming pipeline 232, and outputs outbound streaming packets 234 for delivery to a recipient. For example, streaming program 230 may receive a microphone audio stream 240 that is generated by microphone 216, a camera video stream 242 that is generated by camera 214, a broadcast audio stream 244 of a broadcast program 248, and a broadcast video stream 246 of the broadcast program 248. For example, microphone audio stream 240 and broadcast audio stream 244 each may include a plurality of uncompressed audio frames, and camera video stream 242 and content video stream 246 each may include a plurality of uncompressed video frames. Broadcast program

248 may be executed at computing platform 212 in at least some implementations. However, broadcast program 248 may be at least partially remotely executed at a remote computing platform, such as server system 262 in other implementations.

Streaming program 230 may receive production state data 249 from broadcast program 248. Production state data 249 may include variables regarding the content of the audiovisual broadcast. For example, broadcast program 248 may be a game program configured to broadcast game video and game audio. In this example, production state data 249 may be game state data of the game program, including characters, items, levels, etc., of the game program, and/or other data beyond audio and video representations of the game program that generally relates to the internal state of the game program. In some examples, streaming pipeline 232 may output production state data 249 as part of, or separately from, outbound streaming packets 234 for delivery to a recipient.

It will be appreciated that streaming environment 200 may be implemented for other types of programs and content other than game programs, including but not limited to e-sports (e.g., in which multiple streams corresponding to different players in a multiplayer game program may be produced, potentially in combination with streams corresponding to producers/broadcasters/commentators), and events (e.g., convention events, live concerts, or other live performances). The events illustrated in FIGS. 1B and 1D are examples of some of the events that may be streamed using such a broadcast/production program producing such outputs.

The exchange of various data in streaming environment 200 may be referred to in terms of the data being electronically communicated throughout various locations in the environment. For example, electronically communicating with broadcast program 248 may include receiving one or more of content audio stream 244, content video stream 246, and production state data 249. Such data may be received at source client system 210 (e.g., at a computing device on which broadcast program 248 is executed, such as at streaming program 230), and/or a remote computing system such as a server system 262 and/or remote client system 270, both described below.

Streaming program 230 may be distributed across two or more computing devices that collectively form computing platform 212. As an example, computing platform 212 may include one or more general-purpose processors and/or one or more special purpose logic machines (e.g., a video encoder, graphics processing unit). In this example, streaming program 230 may include software executable by the one or more general-purpose processors, and may include firmware or hardware instructions executable by the one or more special purpose logic machines. Streaming program 230 may take any suitable form. For example, streaming program 230 may be implemented as a dedicated streaming application. In another example, streaming program 230 may be a component of an application, such as broadcast program 248. In other examples, streaming program 230 may be implemented as a service, an application programming interface (API), an application modification (e.g., a video game modification of a video game program providing the functionality of broadcast program 248), and/or a plug-in. In still another example, streaming program 230 may be implemented by an operating system of source client system 210. Although FIG. 2 depicts its implementation at source client system 210, examples are contemplated in which at least a portion of streaming program 230 is implemented at server system 262. In these examples, source client system 210 may transmit production state data 249 to server system 262 in lieu of content audio stream 244 and/or content video stream 246, where the server system may render video and audio streams based on the production state data.

Graphical display device 218 may further present a broadcast interface 252 of broadcast program 248 as a component of GUI 250. Game interface 134 of FIG. 1A is a non-limiting example of broadcast interface 252. When broadcast program 248 is a video game program, broadcast interface 252 may correspond to a game view presented to a player of the video game program.

Streaming pipeline 232 is configured to produce streams from multiple sources. Streaming pipeline 232 may encode different data streams based on the state of the streaming program 230 and/or the data streams received by the streaming program 230. For example, when broadcast program 248 is a video game program, then the streaming program 230 may receive five separate data streams: the microphone audio stream 240, the camera video stream 242, the content audio stream 244 including game audio, the content video stream 246 including game video, and the production state data 249 including game state data. In another example, if the user is live-streaming content without providing additional audiovisual content via broadcast program 248, then the streaming program 230 may receive two separate data streams: the microphone audio stream 240 and the camera video stream 242. Streaming program 230 may facilitate the encoding, synchronization, processing, and transmission of any suitable combination of different input data streams. In another example, streaming pipeline 232 may encode audio, video, and/or state data streams corresponding to multiple participants in an e-sports or other live event, producers, broadcasters, commentators, etc.

In some implementations, streaming pipeline 232 may be configured to package encoded audio and video streams together in the same streaming packets. In other implementations, streaming pipeline 232 may be configured to package the encoded audio stream into streaming audio packets and package the encoded video stream into separate streaming video packets. In other words, streaming pipeline 232 may be configured to process the audio streams and video streams together or separately. Similarly, streaming pipeline 232 may package production state data 249 together with, or separately from, one or both of the audio streams and video streams.

Streaming pipeline 232 is configured to output outbound streaming packets 234 to a remote client system 270 via a network transceiver 259. Network transceiver 259 may be configured to send outbound streaming packets 234 to remote client system 270 via a communication network 260. Network transceiver 259 may include wired and/or wireless communication hardware components compatible with one or more different communication protocols. Network transceiver 259 may be configured to send outbound streaming packets 234 to remote client system 270 according to any suitable wireless communication protocol.

In at least some implementations, server system 262 may receive outbound streaming packets 234 that encode audio, video, and production state data streams from source client system 210, and may facilitate the broadcast of the audio, video, and production state data streams to a population of many remote client systems, such as remote client system 270. In other implementations, source client system 210 may stream audio, video, and production state data directly to receiving client system 270 without the use of an intermediate server system. In some examples, the streaming program 230 may be configured to open a socket connection with server system 262 and/or remote client system 270 via network transceiver 259, and send outbound streaming packets 234 substantially in real-time.

Remote client system 270 may take any suitable form. For example, remote client system 270 may include one or more of a mobile computer (e.g., smartphone), a laptop computer, a desktop computer, a virtual-reality computer, an augmented-reality computer, and a gaming computer. With reference to FIGS. 1A and 1C, remote client system 270 may be remote device 160 or viewing device 160', for example. As such, remote client system 270 may be referred to as a "viewing device." Further, media viewer program 290 may be any suitable type of program configured to present digital media content. In one example, media viewer program 290 is a web browser. In another example, media viewer program 290 is incorporated into a video game program.

Returning to FIG. 2, remote client system 270 may include a graphical display device 272, a computing platform 274, an audio speaker 276, and an input device 278. Computing platform 274 may execute a media viewer program 290 that receives streaming audio, video, and/or game state data in the form of streaming packets from a source, such as source client system 210 or server system 262. Media viewer program 290 may be configured to decode the received streaming packets to extract the audio, video, and/or production state data streams to facilitate the presentation of the streaming audio and/or video, and/or use of the production state data. For example, content video 280 and camera video 282 may be presented via graphical display 272, and mixed audio 286 may be output by audio speaker 276. Because the audio and video streams are synchronized prior to being packaged into the streaming packets by the streaming pipeline 232 of the source client system 210, media viewer program 290 does not have to buffer and synchronize the inbound audio and video streams. Although, in some implementations, remote client system 270 may perform buffering and/or synchronization operations on received streaming packets. For example, remote client system 270 may use a jitter buffer to properly order inbound streaming packets.

Media viewer program 290 may be configured to provide one or more interactive controls 292 that enable interaction between remote client system 270 and source client system 210. In some examples, the selection of an interactive control 292 may affect broadcast program 248 on source client system 210. Accordingly, FIG. 2 shows the generation of remote input 294 upon selection of an interactive control 292 via input device 278. Remote input 294 is transmitted to source client system 210 through network 260 and network transceiver 259 and received in the form of inbound streaming packets 295. Inbound streaming packets 295 may be relayed to source client system 210 via server system 262, while in other implementations remote client system 270 may transmit the inbound streaming packets directly to source client system 210. Inbound streaming packets 295 may be encoded in the shared serialized format.

An interactive control 292 may be configured based on production state data 249 received in outbound streaming packets 234 from source client system 210. As examples with reference to FIG. 1A, when broadcast program 248 is a video game program, interactive control(s) 292 may include one or more of health control 192 and speed control 194, which upon selection may cause the transmission of remote input that affects the state of the video game program, and controls minimap 196 and popup 198, which may be configured according to game state data included in production state data 249 received from source client system 210. In some examples described below, interactive control(s) 292 may be configured based on processed production state data formed by processing production state data 249 to thereby adapt the (unprocessed) game state data to the configuration of remote client system 270.

In further examples with reference to FIGS. 1B-1C, interactive control(s) 292 may include one or more of controls 171, 172, 173, and 174, which upon selection may cause the transmission of remote input that affects the state of a broadcast program 248 executed on broadcast device 110'. As described above, selection of interactive controls 171, 172, 173, and 174 may affect the operation of one or more devices (e.g., broadcast device 110', speakers 106, display 130', lights 131, cameras 913) in environment 101. As such, input generated via selection of interactive control(s) 292 may affect the operation of one or more devices in or communicatively coupled to source client system 210. FIG. 2 illustrates such operational effect, showing the supply of processed remote input 296, formed by processing remote input 294 based on the configuration of source client system 210 as described below, to controllable device(s) 220, which may comprise one or more devices included in or operatively coupled to the source client system, including but not limited to a display device, speaker, light, camera, etc.

In the depicted example, mixed audio 286 corresponds to audio streamed by source client system 210, which includes microphone audio stream 240 and content audio stream 244. Also in this example, game video 280 corresponds to a visual representation of game video stream 246, and camera video 282 corresponds to a visual representation of camera video stream 242. Game video 280 and camera video 282 may be composited prior to streaming in at least some implementations. While game video and camera video are shown in FIG. 2 in a side-by-side configuration within a common GUI 284, it will be understood that other suitable configurations may be supported. For example, camera video 282 may be overlaid upon game video 280 or viceversa. As another example, a user may selectively toggle between a view of game video 280 and a view of camera video 282. As such, game video 280 and camera video 282 may not be concurrently presented in at least some implementations. For broadcast/production programs executed on source client system 210, a user may selectively toggle between different video streams, which may be presented in any suitable manner. Similarly, an interactive control 292 may be displayed in GUI 284 together with game video 280 and camera video 282, or in a GUI separate from one or both of the content video and camera video.

In some implementations, source client system 210 and remote client system 270 may differ in hardware and/or software. As a result, data (e.g., production state data 249, remote input 294) transmitted by one system may be adapted to the configuration of that system, and thus may be unsuitable for a recipient system and its configuration. This may render the recipient system unable to interpret the data and incapable of providing functionality dependent upon such data.

As a particular example of how differing configurations between source client system 210 and remote client system 270 may manifest, broadcast program 248 may be a video game program which may execute, via a proprietary game engine, methods written in a strongly typed, compiled programming language such as C++. In contrast, media viewer program 290 may provide interactive control(s) 292 via web-based markup languages such as HTML and CSS, where the interactive control(s) are selectable to execute methods written in a weakly typed, interpreted programming language such as JavaScript. Accordingly, game state data 249 from source client system 210 may be unsuitable for interpretation by media viewer program 290—for example, the game state data may include complex datatypes that the media viewer program is not configured to handle. Similar issues may be associated with the interpretation of remote input 294 from remote client system 270 by source client system 210. To enable the substantially live, real-time participation by remote client system 270 in production program 248, production state data 249 may be synchronized between the remote client system and source client system 210. Furthermore, inbound streaming packets 295 may include data in the shared serialized format, comprising remote input data which may influence the production program 248. Such input data may comprise remote production state data in a substantially similar format to production state data 249. However, both the synchronization of production state data 249 and the reception of inbound streaming packets 295 may involve the transfer of data across a programming language boundary. To facilitate both 1) interpreting remote input 294 at source system 210 and 2) interpreting production state data 249 at remote client system 270, such remote input data 294 and production state data 249 may be encoded in a shared serialized format, as will be explained below with reference to FIGS. 3-6.

The shared serialized format may be any suitable binary or plain-text format. For example, the shared serialized format may be a code in a data exchange language, such as JSON. The shared serialized format may allow encoding data of primitive data types, for example Boolean, text, and number types. The shared serialized format may restrict use of primitive data to include only primitive types that are common among software configurations (e.g., programming languages) using the shared serialized format. Alternately or additionally, the primitive types may be different than native data types of a software configuration, and a conversion function may be used to represent or approximate primitive types (e.g., Boolean, text, and number types). The shared serialized format further allows encoding structured data. Such structured data may allow embedding values in the shared serialized format within larger structures. For example, as in JSON, the shared serialized format allows encoding mappings of key-value pairs comprising a textual key and a value in the shared serialized format. Similarly, the shared serialized format allows encoding arrays comprising a sequence of values in the shared serialized format. It will be appreciated that the various combinations of primitive values, key-value pairs and arrays allow flexibly encoding a wide variety of data structures. Production state data 249 may be further implemented as a game state data stream comprising a sequence of packets comprising fragments of shared serialized format code defining data in the shared serialized format. The game state data stream may include packets sent periodically or aperiodically according to communication arising from the broadcast and remote clients. Such packets may be time-stamped, labelled with priority and ordering information, or otherwise demarcated with additional metadata in any suitable fashion according to the needs of the broadcast and remote clients.

However, even with a shared serialized format, still other issues may be associated with the differing configurations of source client system 210 and remote client system 270. For example, transferred data may include dynamic properties not contemplated by developers of one or more of the remote client system and the source client system. For example, a source client system may execute methods compiled in C++ via a proprietary video game engine. Such methods may be able to process game state data in an optimized manner, enabling a reduced latency in producing game content. However, such methods may only be able to process data according to a predefined data structure format, according to a static typing enforced in the compilation of broadcast program 248. Such static typing may be predefined in advance at the time the broadcast program 248 is written. In contrast, a shared serialized format, such as a format based on JSON, allows expressing a variety of data structures not conforming to any predefined format. As such, broadcast program 248 may not be able to interpret an arbitrary inbound streaming packet. For example, a streaming packet may include data generated by a new version of a remote client and not contemplated by a developer of the source client. In the extreme, a streaming packet may include an arbitrary set of key-value pairs, which may be suitable for some implementations of a source or remote client, according to diverse capabilities of clients.

In some cases, a client program may be implemented using a language with dynamic typing, for example, JavaScript. In this case, arbitrary data may be interpreted from the shared serialized format and not according to any predefined static typing. For example, in JavaScript, a program may interpret JSON as a native JavaScript value using built-in operations. However, programs implemented via languages with dynamic typing may be slower than programs implemented via compiled languages with static typing such as C++. As such, a developer of a client program such as a source client of a video game may wish to use a language with static typing. Even when a language with dynamic typing is used, the implementation may include statically-typed, compiled code. For example, web client programs may be optimized using technologies such as Chrome Native Client (NaCl), ASM.js, or WebAssembly. Such technologies, which may be browser-specific (as with NaCl) or standardized, allow extending JavaScript with functionality implemented via a statically-typed source program, which may be compiled or just-in-time compiled. Such compilation may include optimization based at least on the static typing information. Furthermore, although a program implemented via a language with dynamic typing may be able to interpret arbitrary received data in the shared serialized format into native data values, utilizing the resulting native values to retrieve or modify a specific property may require an unsafe traversal method, e.g., recursively traversing every mapping of key-value pairs and every array contained within a potentially large received datum. As such, even when the client program is implemented via a language with dynamic typing, differing configurations of source client system 210 and remote client system 270 may present an increased technical burden.

FIG. 2 illustrates a system configured to allow participation by a remote client system 270 in broadcast program 248. Broadcast program 248 may be any suitable program useable to prepare content for a broadcast, such as the examples of a video game program, a live event broadcast program, and an e-sports broadcast program, described above with reference to FIGS. 1A, 1B-1C and 1D, respectively. Specifically, FIG. 2 shows the processing of remote input 294, generated at remote client system 270 upon the selection of an interactive control 292, to form processed remote input 296 that is then fed to broadcast program 248. Unlike (unprocessed) remote input 294, processed remote input 296 may be suitable for the configuration of source client system 210 and its interpretation by broadcast program 248. FIG. 2 also shows the processing of production state data 249, generated by broadcast program 248 at source client system 210, to form processed production state data 298 that is then fed to media viewer program 290. Unlike (unprocessed) production state data 249, processed production state data 298 may be suitable for the configuration of remote client system 270 and its interpretation by media viewer program 290.

A backend service for state management of dynamic properties, as described herein, may be implemented at any suitable location(s) in audiovisual streaming environment 200. In some implementations, streaming program 230 may process remote input 294 to form processed remote input 296, and/or to process production state data 249 to form processed production state data 298. Alternatively or additionally, media viewer program 290 may perform one or both of these functions. Alternatively or additionally, server system 262 may perform one or both of these functions.

Example backend methods for state management of dynamic properties are disclosed herein. The backend methods address issues associated with differing hardware, software, and input modalities between source client system 210 and remote client system 270. Such methods may be implemented for a source client system 210, and utilized in any suitable manner in components of the source client system 210, for example, as part of the processing of production state data 249 and processed remote input 296 in streaming program 230. Similarly, the backend service may be implemented for a remote client, and utilized suitably, for example, in the processing of remote input 294 or of processed production state data 298. The backend service may be implemented via code generated based on one or more interface definition code fragments. For example, a developer may utilize code generation method 600 of FIG. 6 to generate code executable at server system 262 of FIG. 2 based on the interface definition code fragment of FIG. 3E. The developer may alternatively or additionally generate code executable at source client system 210, and/or at remote client system 270, based on the same interface definition code fragments. The developer may perform code generation method 600 via code executed at server system 262, source client system 210, and/or remote client system 270, or via code executed at a separate development computer. The generated executable code may be distributed to server system 262, source client system 210, and/or remote client system 270 in any suitable fashion.

Figure 4A:
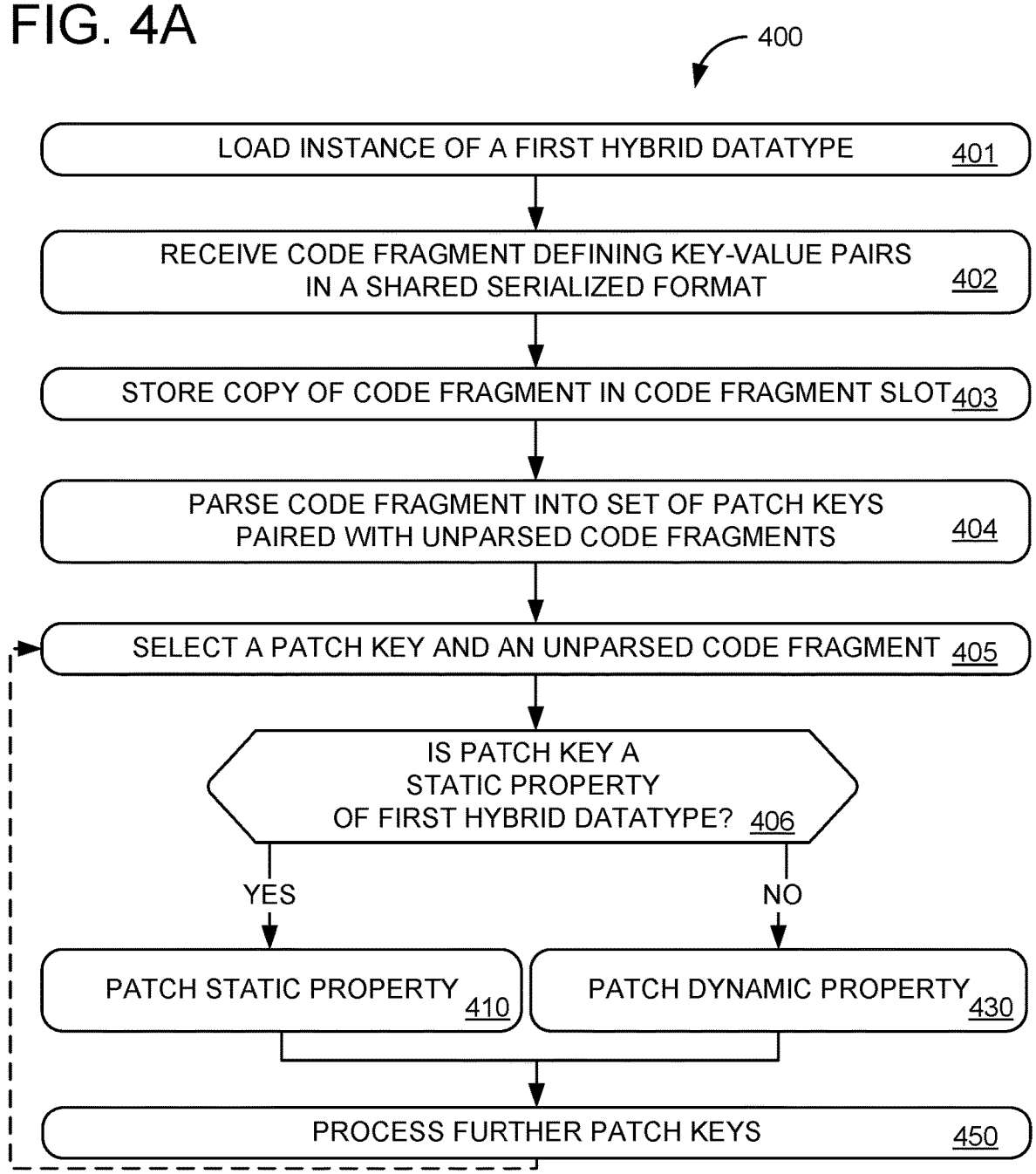
FIG. 4A shows a method to patch an instance of a hybrid data type.
Figure 5A:
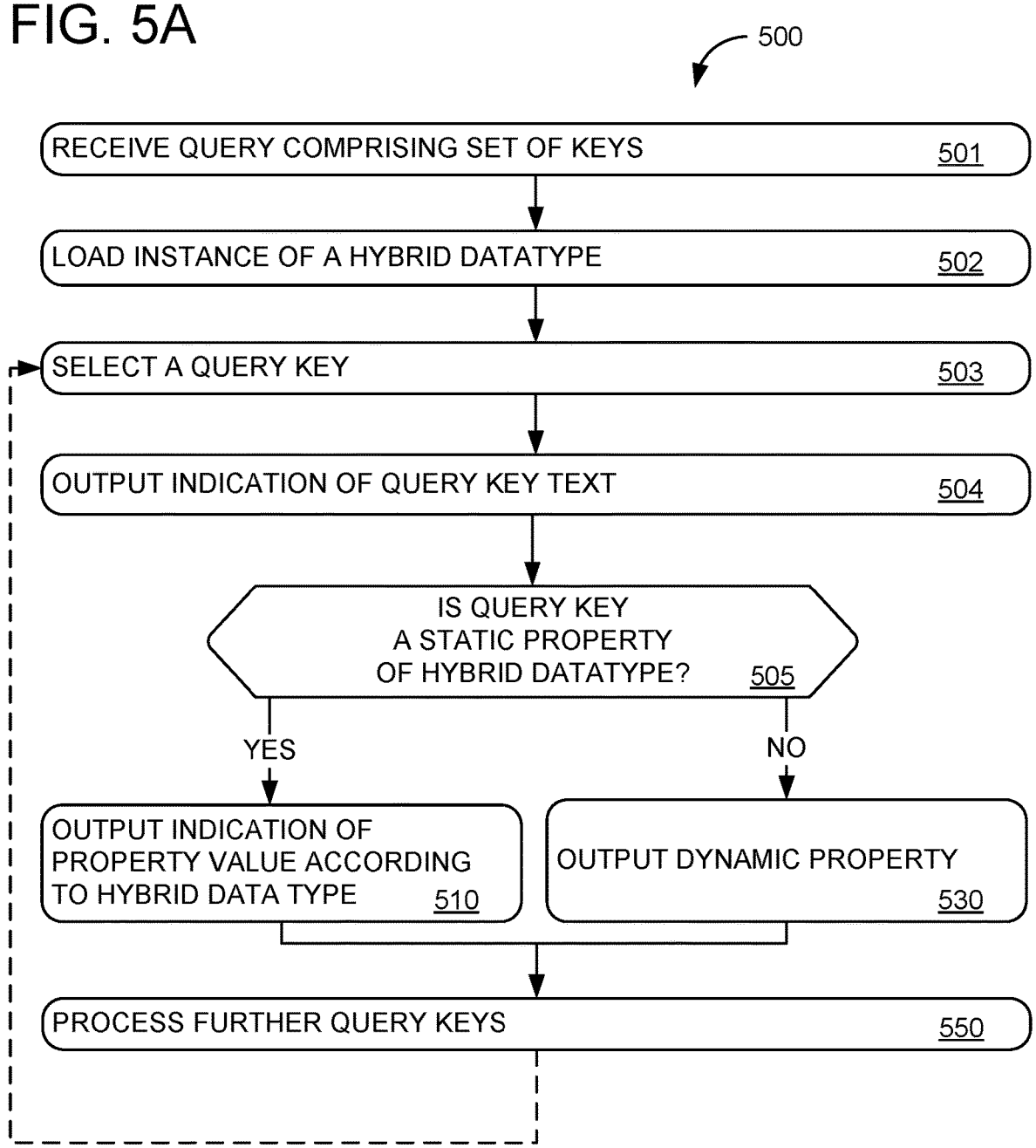
FIG. 5A shows a method to print properties of an instance of a hybrid data type to obtain a code fragment in a shared serialized format.

The methods for the backend service for state management of dynamic properties as disclosed herein include 1) a patcher method for updating a hybrid data instance according to a code fragment in the shared serialized format, 2) an output method to output properties of a hybrid data instance in the shared serialized format, and 3) a method for generating code executable to perform the patcher and output methods in the context of a particular hybrid datatype. Patcher method 400 of FIG. 4A is a method to interpret an inbound datum comprising a code fragment in a shared serialized format defining a set of key-value pairs (e.g., based on JSON) to instantiate or modify an optimized and validated datum in a hybrid format comprising 1) a code fragment in the shared serialized format, 2) a native datatype definition comprising static properties suitable for further processing in a client program, and 3) code executable to dynamically map further dynamic properties. Output method 500 of FIG. 5A is a method to translate a datum in the hybrid format into an outbound datum comprising a code fragment in the shared serialized format. Code generation method 600 of FIG. 6A is a method to interpret an interface definition defining a particular hybrid datatype to generate code executable to patch and output hybrid data instances of the particular hybrid datatype. For example, method 600 may include generating code executable to patch a hybrid data instance according to patcher method 400. Similarly, method 600 may include generating code executable to output a hybrid data instance according to output method 500.

A backend service for state management of dynamic properties is not specific to a particular source or remote client. Instead, the backend service may be implemented for each source and remote client in a substantially similar fashion, according to the hardware and/or software configuration of the source and remote clients. Different source and remote clients implemented for a particular hardware and/or software configuration may use substantially identical implementations of the backend service for state management of dynamic properties. Nonetheless, the utilization of the methods of the backend service for state management of dynamic properties allows different source and remote clients to send and receive data including substantially different sets of dynamic properties.

Figure 3A:
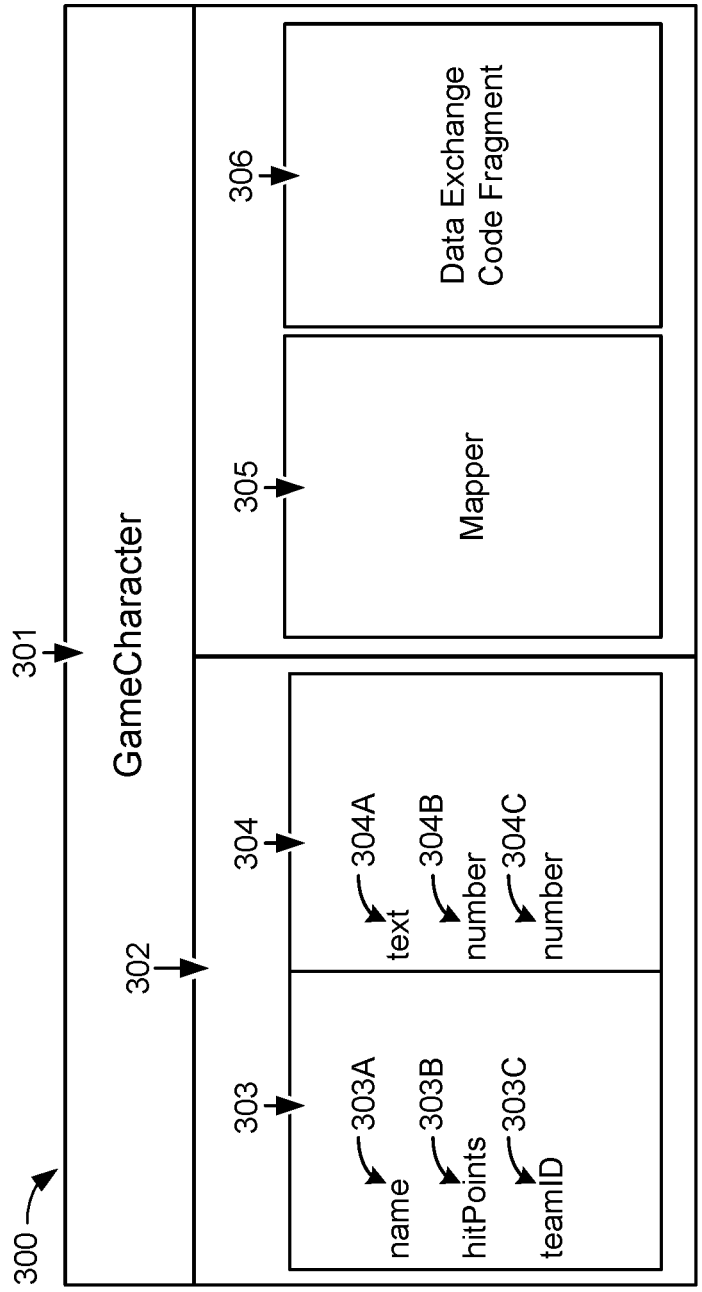
FIG. 3A illustrates a definition of a hybrid data type having partially static and partially dynamic properties.

FIG. 3A depicts an example of a hybrid datatype 300 suitable for use as a native representation of data having dynamic properties. Hybrid datatype 300 has a type name 301, in this case, "GameCharacter." Hybrid datatype 300 is an example of a hybrid datatype representing data of a video game (e.g., for when broadcast program 248 is a video game program), although it will be appreciated that hybrid datatypes may be used to represent data of any suitable broadcast program. Hybrid datatype 300 includes a static interface 302 comprising static property fields. The set of fields are specified by field names 303 and field types 304. Each field name has a corresponding field type marking the type of value that the memory is configured to hold. For example, the "name" field holds a textual value, as specified by field name 303A and the field type 304A. Similarly, field name 303B and field type 304B specify a "hitPoints" field holding a numeric value, and field name 303C and field type 304C specify a "teamID" field holding another numeric value. Hybrid datatype 300 further includes a dynamic interface comprising a mapper 305 and a code fragment slot 306. Mapper 305 includes code executable to receive a dynamic property name and determine a corresponding location of a dynamic property held within a mapping, as will be explained in more detail with reference to FIG. 4-6 below. Hybrid datatype 300 further includes a code fragment slot 306 comprising memory configured to store a textual representation of a code fragment in a shared serialized format. For example, code fragment slot 306 may be configured to store a code fragment in a data exchange language such as JSON.

Figure 3B:
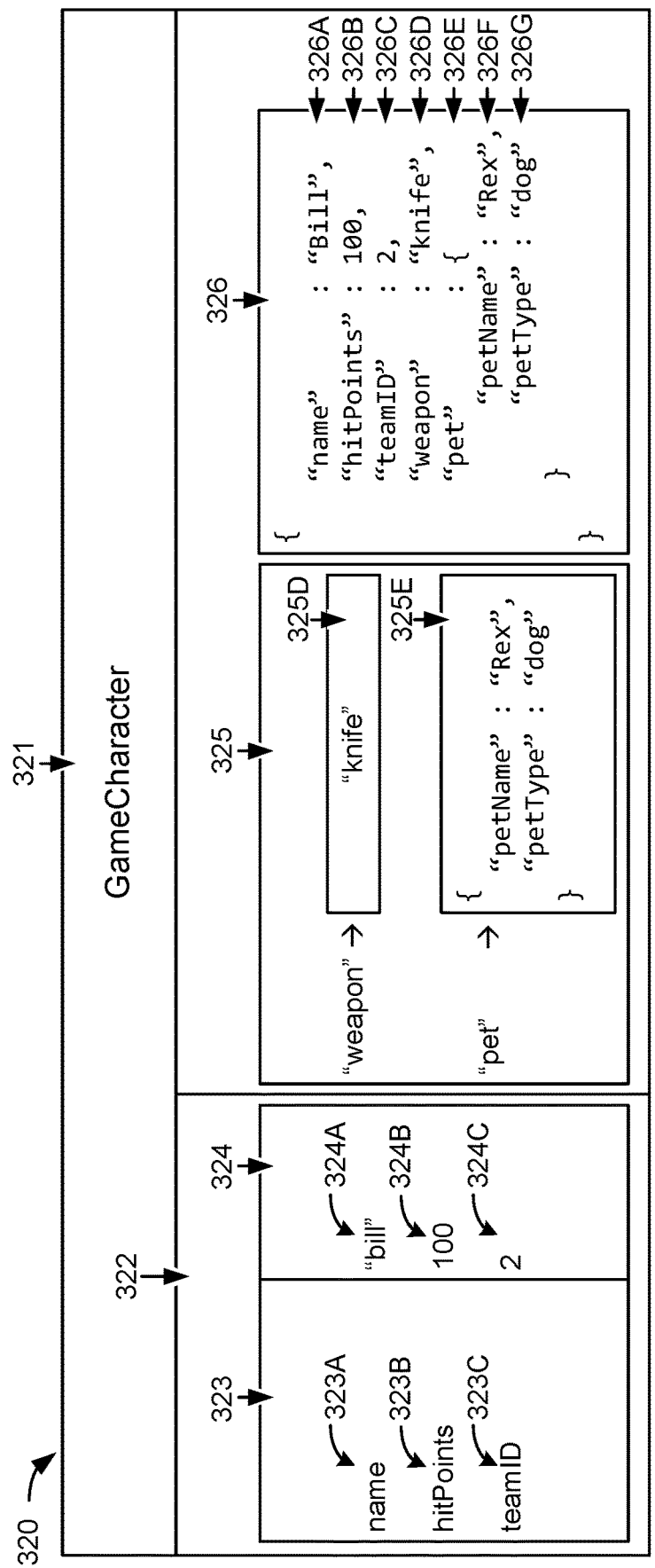
FIG. 3B shows an example instance of the data structure of FIG. 3A.

Hybrid datatype 300 may be instantiated to hold specific values in the fields of its static interface 302 and in the mapper 305 and code fragment slot 306 of its dynamic interface. For example, hybrid datatype 300 may be instantiated to a hybrid data instance 320, as depicted in FIG. 3B. Hybrid data instance 320 may include a type name indication 321 of the associated hybrid datatype's type name 301. Hybrid data instance 320 may include a static section 322, storing data which may be accessed according to the static interface 302. Such data may be arranged in memory according to the static interface 302 and accessible via the field names 323 to obtain corresponding field values 324. In this example, according to static interface 302, the hybrid data instance 320 is configured to store 1) a "name" field 323A holding a field value 324A of type "text" representing the text "Bill"; 2) a "hitPoints" field 323B holding a field value 324B of type number representing the number 100; and 3) a "teamID" field 323C holding a field value 324C of type number representing the number 2.

Hybrid data instance 320 may further include a dynamic section comprising mapper instance 325 and code fragment 326. Mapper instance 325 may define a set of key-value pairs, wherein the key is textual data naming a dynamic property, and the value may be a code fragment in the shared serialized format, a value of a native datatype, a tree structure or hash table indexable by the key, or any other suitable implementation of a dynamic mapping of key-value pairs. In the example illustrated in FIG. 3B, mapper instance 325 holds a mapping 325D from a key "weapon" to a textual value "knife." Mapper instance 325 further holds a mapping 325E from a key "pet" to a code fragment in the shared serialized format defining an instance of a game character pet datatype. The dynamic properties associated with the "weapon" and "pet" keys of mappings 325D and 325E may not have not been contemplated when hybrid datatype 300 was designed.

Code fragment 326 may be a code fragment in a data exchange language, represented as a textual value or in any other suitable fashion. Code fragment 326 may define the full set of static and dynamic properties of hybrid data instance 320. For example, code fragment 326 is a JSON fragment which defines static properties 326A, 326B, and 326C corresponding to static interface 302 and suitable to instantiate static section 322. Code fragment 326 further defines dynamic properties 326D defining the "knife" key-value mapping, and 326E defining the "pet" in terms of an embedded JSON object holding a "petName" property 326F and a "petType" property 326G. Note that the "pet" JSON object is stored directly as a code fragment as the value of the "pet" mapping 325E, without being further parsed into a native value.

Alternately or additionally, code fragment 326 may define a subset of the keys associated with properties of hybrid datatype 300, or may define a key more than one time. For example, code fragment 326 may contain an append-only log of time-stamped JSON code fragments representing a most recent update to a property, where the same key, e.g., "name," may occur multiple times in combination with different time-stamps and/or text values. Such an append-only log may be suitable to recover a defined value of each static and dynamic property of a data instance by reading the log to find most recent values for each property. Furthermore, such a log may facilitate efficient, atomic updates to the value of the data instance, e.g., due to the simplicity and wide-spread support of an operation to append to a text file in various hardware and/or software configurations.

Whether code fragment 326 encodes each key-value pair just once or multiple times as in an append-only log, code fragment 326 may redundantly encode the same data as hybrid data instance 320. This redundant encoding may facilitate efficient atomic updates, but may be unsuitable for efficiently performing optimized operations on the hybrid datatype. Instead, optimized operations may be performed using data stored in the static section 322 according to static interface 302, and using the contents of mapper instance 325 according to mapper 305. Operations to be performed using data stored in the static section may be native operations taking advantage of an efficient implementation of the static section (e.g., efficient memory layout may enable fast access or traversal times for the data). Similarly, operations to be performed using data stored in the mapper instance 325 may rely on optimized code of mapper 305, executable to efficiently traverse mapper instance 325 to retrieve a location of a stored dynamic property.

An indication of each of the field names 323 optionally may be stored in hybrid data instance 320 to facilitate accessing data via the field names. Alternately, hybrid data instance 320 may not include an explicit stored representation of the field names. Field values 324 may be accessible based on a predefined convention (e.g., associating each field name with a memory offset, relative to a contiguous area of memory storing hybrid data instance 320, based on its static type). Alternately or additionally, field values 324 may be accessible based on data associated with mapper instance 325.

FIG. 4A depicts a patcher method 400 for updating or instantiating an instance of a hybrid datatype, according to a hybrid datatype definition and based on a received key-value pair specifying an updated (static or dynamic) property. Patcher method 400 may be performed based on executable code distributed across audiovisual streaming environment 200 of FIG. 2 in any suitable fashion. For example, patcher method 400 may be implemented by code running on source client system 210 (e.g., in broadcast program 248, streaming program 230, or any other suitable location), code running on server system 262, and/or code running on remote client system 270 (e.g., as part of media viewer program 290). For example, production state data 249 may be stored as a hybrid data instance of a hybrid data type, and patcher method 400 may be performed in broadcast program 248 to patch the hybrid data instance according to inbound streaming packets 295 comprising key-value pairs in a shared serialized format. Patcher method 400 may be performed differently for each of the hybrid data types. Code generated via an automatic method, such as code generation method 600 of FIG. 6, may implement patcher method 400. At 401, method 400 includes loading an instance of a first hybrid datatype. For example, method 400 may include loading hybrid data instance 320 of FIG. 3B. The first hybrid datatype may be loaded according to a predefined choice of hybrid datatype specified by a developer of the program, based on a runtime state of the program, or selected and loaded in any other suitable way. For example, hybrid data instance 320 may be loaded based on accessing stored data having hybrid datatype 300 (as defined in FIG. 3A).

At 402, method 400 includes receiving a code fragment defining key-value pairs in a shared serialized format of the program. As explained above with reference to FIGS. 1-3, the shared serialized format may be any suitable format, such as a data exchange language (e.g., JSON). The shared serialized format may be common to the program and other clients with which the program is designed to interact. At 403, method 400 includes storing a representation of the received code fragment into a code fragment slot of the hybrid data instance. The representation may be a textual representation or any other suitable representation of the received code fragment. For example, in FIG. 3B, code fragment 326 is stored as a textual representation of JSON code. The code fragment slot may store the received code fragment overwriting previously received code fragments, or the received code fragment may be stored in addition to previously received code fragments. For example, as described above with reference to FIG. 3B, the code fragment slot may be used to store an append-only log of time-stamped code fragments, which may facilitate atomic updates to the hybrid data instance.

At 404, method 400 includes parsing the code fragment to obtain a set of key-value pairs, each pair comprising a top-level key to be patched, paired with an unparsed code fragment. At 405, method 400 includes selecting a first patch key to process from among the top-level keys. At 406, method 400 includes determining how to process the patch key according to whether the patch key is defined as a static property of the first hybrid datatype, e.g., among the static section 322 of hybrid data instance 320 as in FIG. 3B. If the patch key is defined as a static property of the first hybrid datatype, method 400 includes processing the patch key to update the static property at 410. For example, the patch key may be processed according to patcher static update method 410', as described below with reference to FIG. 4B. Otherwise, the patch key is a dynamic property, and method 400 includes processing the patch key to update the dynamic property at 430. For example, the patch key may be processed according to patcher dynamic update method 430', as described below with reference to FIG. 4C. In either case, after such processing, at 450, method 400 includes determining whether to process a further patch key and its paired unparsed code fragment. If another patch key is to be processed (e.g., if there are unprocessed patch keys in the set of patch keys), method 400 includes looping back to 405 to select another key and proceed accordingly.

FIG. 4B shows patcher static update method 410', which may be used to patch a static property of a hybrid data instance, as in patcher method 400. For example, hybrid datatype 300 has a first static property, "name," as specified by field name 303A. The "name" property stores a value of type "string" as specified by field type 304A. Accordingly, method 410' may be used to update an instance of hybrid datatype 300, such as hybrid data instance 320, according to a key-value pair in which the patch key is "name."

At 411, method 410' includes validating the incoming code fragment according to a static datatype defined for the static property by the first hybrid datatype by a field type. Such validation may include checking the size and/or contents of the incoming code fragment. For example, when processing a key-value pair comprising the key "name" to obtain a value of type "text," such validation may include processing up to a maximum length of text (e.g., to prevent buffer overflow errors). Additionally, such validation may include developer-specified validation, suitable for the needs of a hybrid datatype.

At 412, method 410' includes determining whether the property field has a native type, such as "text", "number", or any other datatype supported by an implementation language of the backend for state management of dynamic properties, e.g., an array type. If the property field does have a native type, method 410' includes parsing the code fragment into a value of the native type at 413. Otherwise, the property field may have dynamic properties, and may be treated as a hybrid type, in which case method 410' includes recursively updating the static property based on an instance of a second hybrid datatype specified in the field type at 414. To recursively update the instance of the second hybrid datatype, method 410' includes recursively performing method 400 to update the instance of the second hybrid datatype according to said second hybrid datatype. In either case, after parsing the code fragment into a native value or an instance of a second hybrid datatype and updating the first hybrid data instance accordingly, at 429, method 410' includes returning to patcher method 400 in FIG. 4A. As described above, at 450, method 400 includes determining whether to process additional key-value pairs, and optionally returning to 405 to do so.

Figure 4C:
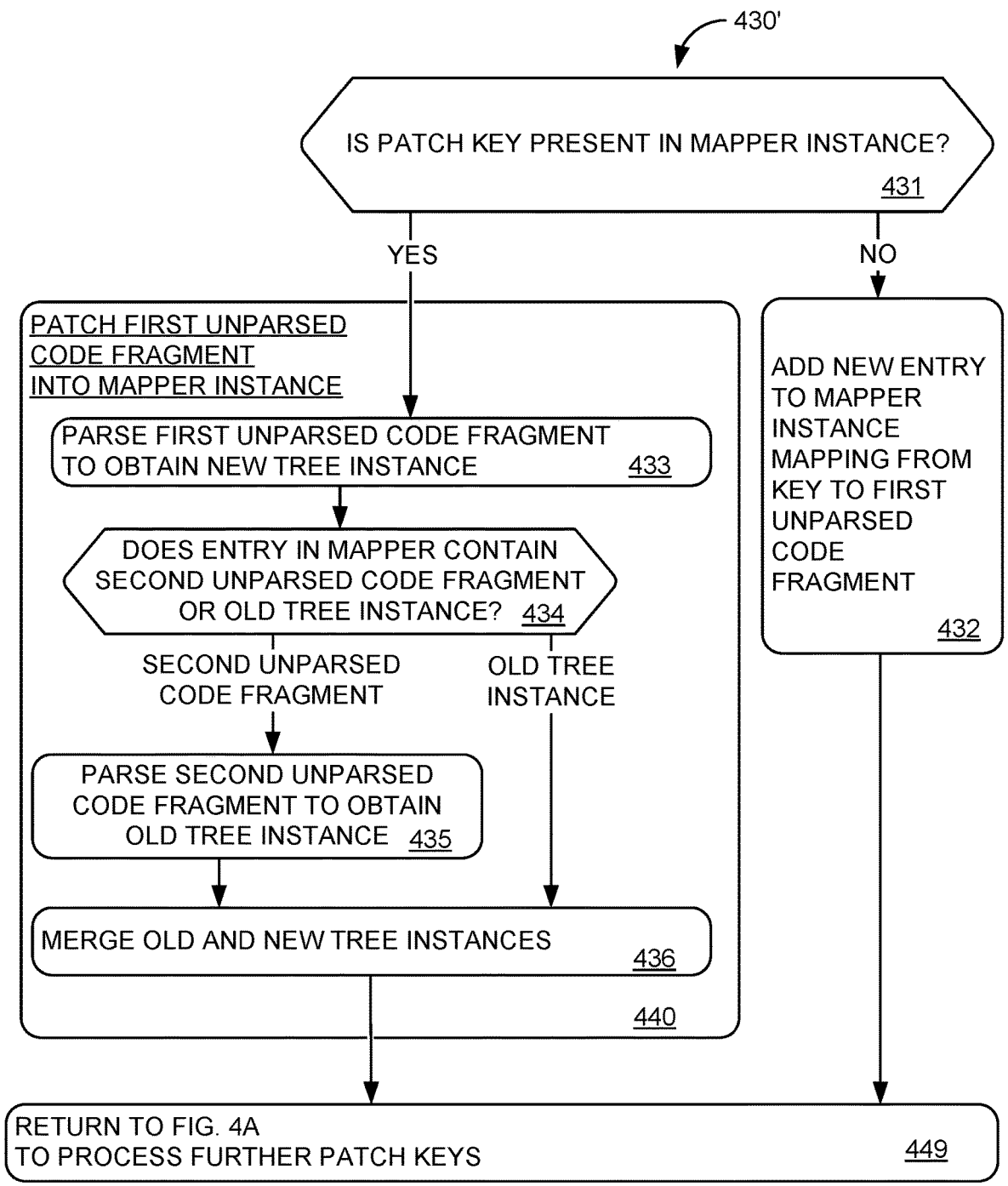
FIG. 4C shows a method to patch a dynamic property.

FIG. 4C shows patcher dynamic update method 430', which may be used to patch a dynamic property of a hybrid data instance. For example, hybrid datatype 300 (shown in FIG. 3A) may be updated or instantiated, as in hybrid data instance 320, to have a dynamic property 325E called "pet" having a composite value. In this case, the composite value of the "pet" field is defined by code fragment 326E containing two key-value pairs 326F and 326G defining further dynamic properties of a "pet". At 431, method 430' includes determining whether the patch key is present in the mapper instance. If the patch key is present, method 430' includes patching the first unparsed code fragment into the mapper instance as in block 440 starting at 433. Otherwise, if the patch key is not present, method 430' includes adding a new mapping to the mapper instance mapping from the patch key to the first unparsed code fragment at 432. In either case, method 430' includes updating the mapper instance 325 according to the received key-value pair. After parsing the code fragment into a native value or an instance of a second hybrid datatype, at 449, method 430' includes returning to patcher method 400 in FIG. 4A. As described above, at 450, method 400 includes determining whether to process additional key-value pairs, and optionally returning to 405 to do so.

In the case that mapper instance 325 (shown in FIG. 3A) did not yet have a mapping corresponding to the "pet" key, method 430' includes adding a new mapping to the mapper instance 325 mapping from the key to the first unparsed code fragment at 432. For example, FIG. 3B depicts hybrid data instance 320 in a state the mapper instance 325 includes a mapping from the "pet" key to code fragment 325E. After updating the mapper instance accordingly, method 430' includes returning to method 400 to process further patch keys at 449, as described above. It will be appreciated that mapper instance 325 may store code fragment 325E in a substantially unparsed form until data defined by code fragment 325E is needed, and then may iteratively, partially parse code fragment 325E to handle subsequent updates, as described below with reference to 433, 434, 435, and 436.

In the case that mapper instance 325 (as shown in FIG. 3B) already defined the "pet" key, as in mapping 325E, method 430' includes parsing the value of the key-value pair. The value of the key value pair comprises a first unparsed code fragment, which may be represented by a plaintext code such as {"petName": "Fido", "petType": "dog"}, e.g., arising from the code fragment shown in FIG. 3C. After such parsing, the method may obtain a tree instance, comprising a recursive embedding of a new mapper instance. In this way, the new mapper instance forms a subtree of the original mapper instance 325. Compared to an unparsed code fragment (e.g., the code fragment in mapping 325E), a tree comprised of dynamic mappers may be more suitable for accessing key-value pairs using the key as an index. It will be appreciated that the mapper instances may be implemented via any suitable data structure mapping textual keys to untyped values, where such values may include unparsed code or recursively embedded sub-trees defining additional mapper instances. For example, the above code fragment may be parsed to obtain a tree with two key-value pair entries. Method 430' includes determining whether the existing mapping (e.g., mapping 325E) in the mapper instance (e.g., mapper instance 325) contains a second unparsed code fragment or an old tree instance representing an old code fragment at 434. In the case of FIG. 3B, mapping 325E contains a second unparsed code fragment. In this case, method 430' includes parsing the second unparsed code fragment at 435, to obtain an old tree instance representing the old code fragment. It will be appreciated that this old tree instance contains key-value pairs that were already present in the dynamic mapper, albeit not yet parsed into a readily useable data structure. Instead, said key-value pairs may be fully processed only when needed, e.g., when resolving an update to the mapper instance 325. Alternately, if the mapping in the mapper contains an already-parsed old tree instance, the old tree instance may be used directly. At 436, method 430' includes merging the old tree instance (parsed at 435 or obtained directly) with the new tree instance, to produce a new key containing the union of the keys in the old and new trees. This merging of the old tree instance and the new tree instance may result in a new mapper instance containing the most recently updated key-value pairs defining each dynamic property of the first hybrid datatype. For example, after updating hybrid data instance 320 of FIG. 3B according to the plaintext code from above, {"petName": "Fido", "petType": "dog"}, mapper instance 325 would still contain exactly one "pet" mapping, which would point to a tree instance specifying the dynamic properties as key-value pairs, such that the pet is still a dog, but its name is now "Fido". After such merging, method 430' includes returning to patcher method 400 in FIG. 4A. As described above, at 450, method 400 includes determining whether to process additional key-value pairs, and optionally returning to 405 to do so.

Alternately or in addition to merging the old tree instance and the new tree instances, method 430' at 436 may include merging the first unparsed code fragment and the second unparsed code fragment directly, and only parsing the unparsed code fragments to obtain a merged tree instance at a later time. For example, when the first and second unparsed code fragments are logs of time-stamped key-value pairs, as described above, the first and second code fragments may be merged by making a new log including the time-stamped key-value pairs of both the first and second unparsed code fragments in order according to the time-stamps, resulting in a combined code fragment. At a later time, the combined code fragment may be parsed to obtain the new mapper instance containing the most recently updated key-value pairs defining each dynamic property of the first hybrid datatype, by building a mapper instance including mappings for the most recently updated key-value pairs according to the sorted time-stamps.

Hybrid data instance 320 of FIG. 3B may be updated using a patcher method (e.g., patcher method 400 of FIG. 4A) based on receiving a key-value set, such as defined by the code fragment of FIG. 3C. In a case where received keys include all of the field names defined in the static interface of a hybrid data type (e.g., field names 303 of hybrid data type 300), patcher method 400 may be used to initialize a new instance of the hybrid data type. For example, based on receiving the key-value set defined in the code fragment of FIG. 3C, and as described above, patcher method 400 may be used to initialize a new "GameCharacter" (without first loading hybrid data instance 320 of FIG. 3B).

FIG. 5A depicts an output method 500 for querying properties of an instance of a hybrid datatype, according to a hybrid datatype definition, to obtain an output code fragment in the shared serialized format representing the properties. Output method 500 may be provided as executable code distributed across audiovisual streaming environment 200 of FIG. 2 in any suitable fashion. For example, an implementation of output method 500 may include code running on source client system 210 (e.g., in broadcast program 248, streaming program 230, or any other suitable location), code running on server system 262, and/or code running on remote client system 270 (e.g., as part of media viewer program 290). Output method 500 may be provided for one or more hybrid data types, in which case an implementation may comprise separate code to perform output method 500 for each of the hybrid data types. Output method 500 may be implemented as code generated via an automatic method, such as code generation method 600 of FIG. 6. Method 500 may be used to output property values for use in communication over a network, or in updating another instance of a hybrid data type. For example, production state data 249 may be stored as a hybrid data instance of a hybrid data type, and method 500 may be performed in streaming program 230 to output outbound streaming packets 234 in a shared serialized format based on the hybrid data instance.

At 501, method 500 includes receiving a query comprising a set of query keys. For example, a query may be a single key, "pet." At 502, method 500 includes loading an instance of a hybrid datatype to query. For example, hybrid data instance 320 as shown in FIG. 3B may be loaded. At 503, method 500 includes selecting a query key to process. If more than one key was received, then a first key may be processed, selected based on any suitable criterion (e.g., alphabetical ordering of keys, or an order in which the keys were supplied). After selecting a key, at 504, method 500 includes outputting an indication of the key being processed. For example, to serialize a set of properties of a hybrid data type, each property may be output as a key-value pair by outputting the key and then the value. At 505, method 500 includes determining whether the key represents a static property or a dynamic property. For example, the "pet" key represents a query to output the dynamic "pet" field defined in mapping 325E of hybrid data instance 320 of FIG. 3B. If the key corresponds to a static property of the hybrid datatype, method 500 includes outputting an indication of the property value according to the hybrid datatype at 510. The static property may have a native type which may be output by using a native or developer-defined print function. For example, the query key "name" corresponds to the "name" static property defined by field name 323A of hybrid data instance 320, having type "text" as specified by field type 304A. In this case, printing the "name" property would include printing the text "Bill." Alternately, the static property may also be an instance of a second hybrid datatype, which may be output by recursively performing method 500 according to the second hybrid datatype (similar to the recursive use of method 400 according to a second hybrid datatype as shown in FIG. 4B). Back at 505, if the query key is not a static key of the hybrid datatype, then the query key is a dynamic property of the hybrid datatype if it is a property of the hybrid datatype at all. As such, method 500 includes outputting the dynamic property according to dynamic output method 530', as described below with reference to FIG. 5B. In any case, as in method 400, there may be a set of multiple query keys to process, which may be processed sequentially by processing a first key, then, eventually, at 550, determining whether to return to 503 and process a further key.

FIG. 5B shows dynamic output method 530' which may be used to output a dynamic property of a hybrid data instance. In an example above, the "pet" key is a dynamic property of hybrid data instance 320, so to output a property based on this key, method 500 would include outputting the dynamic property at 530 after determining the query key was a dynamic property in 505, e.g., by performing method 530'. At 531, method 530' includes determining whether the query key is present in the mapper instance 325. If the query key is not present, method 530' includes outputting an indication of absence of the query key (e.g., an error message) at 533. Alternately, if the query key is present, method 530' includes determining whether the value in the mapping is an unparsed code fragment at 532. If the mapping contains an unparsed code fragment, method 530' includes optionally parsing and validating the unparsed code fragment according to the hybrid datatype (e.g., as described above with reference to FIG. 4B). The resulting value may be cached for subsequent use, as in 534. If the mapping has already been parsed into a value, then method 530' includes outputting an indication of the value at 535. Alternately, even if the mapping is an unparsed code fragment, the unparsed code fragment may comprise a sufficient indication of its own value, and may be output at 535 without first performing parsing or validation. Finally, after outputting a value, method 530' includes returning via 549 to method 500, which may process further patch keys as described above.

An output method (e.g., method 500 of FIG. 5A) may be used to flexibly encode data in a shared serialized format, to be exchanged in an interactive system. Accordingly, a patcher method (e.g., method 400 of FIG. 4A) may be used to decode such encoded information. Using a suitable combination of output methods and patcher methods, hybrid data types may be dynamically updated with static or dynamic properties, allowing the dynamic configuration of properties in an interactive system as described in detail above with reference to FIGS. 1 and 2. As will be described below with reference to FIG. 6, the output method and patcher method may be realized for a particular choice of hardware and software configuration and based on a particular hybrid datatype, by generating executable code.

The methods (400, 410', 430', 500, and 530') described above with reference to FIGS. 4-5 may be implemented for a particular hybrid datatype via generation of executable code based on a static interface definition such as interface definition 341 of FIG. 3E and generated with a code generation method (e.g., code generation method 600, as described below with reference to FIG. 6). The static interface definition may define the hybrid datatype, the definition comprising a hybrid datatype name and a set of field definitions, each field definition comprising a field name and a field datatype. For example, interface definition 341 is defined to include a set of three field definitions. The first field definition defines a field with a field called "name" configured to store a value of datatype "text," as defined by field name 343A and field datatype 344A. Similarly, the second and third fields are named "hitPoints" and "teamID," and are defined by field names 343B and 343C respectively, and are both configured to store values of type "number," as specified by field types 344B and 344C. In addition to specifying field datatype information, interface definition 341 may specify validation information associated with an interface field, e.g., a maximum size of value that can be stored in the field.

Figure 6:
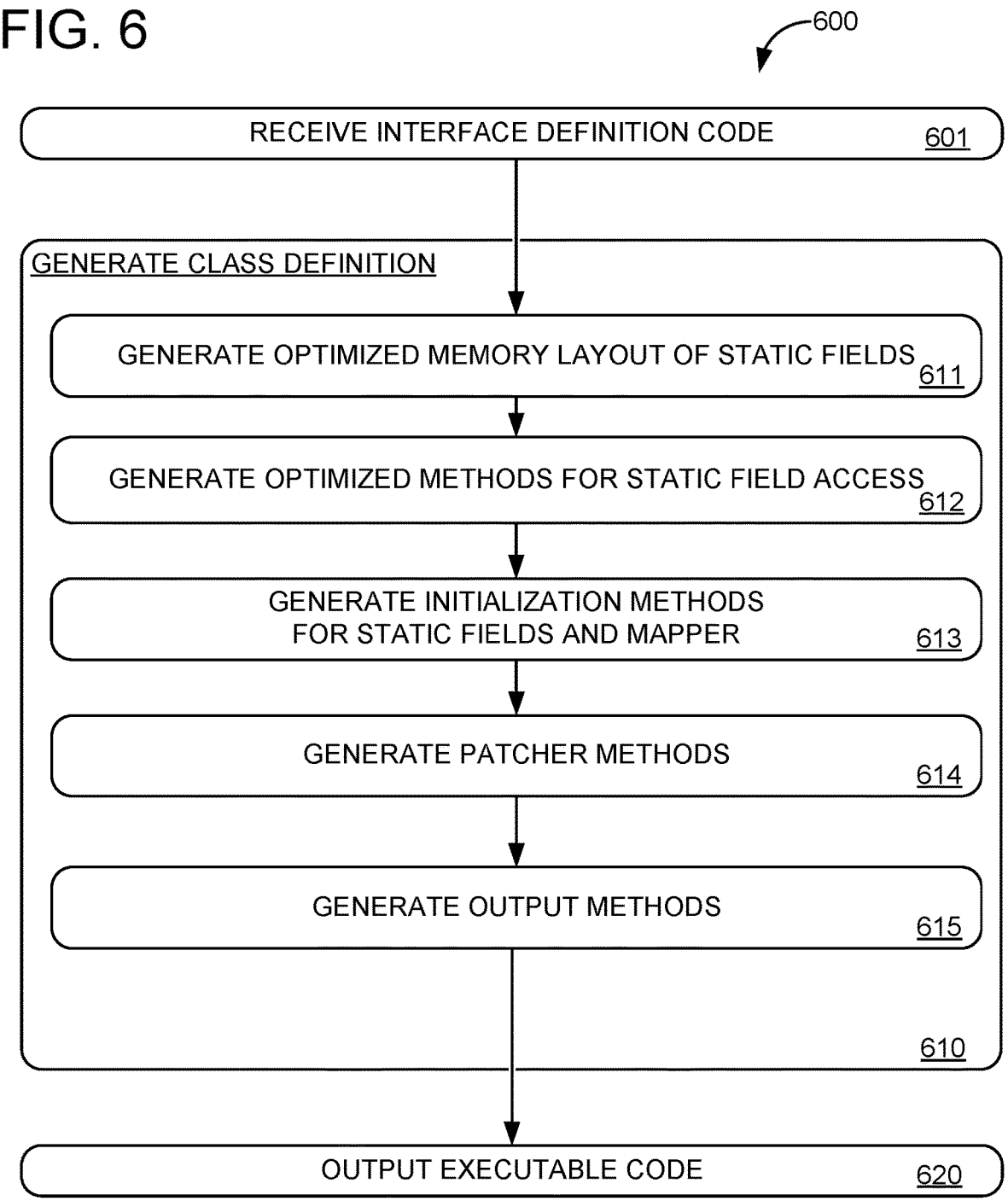
FIG. 6 shows a method to interpret an interface definition code fragment.

FIG. 6 shows code generation method 600. Code generation method 600 may be used by a developer of software for an audiovisual streaming environment 200 of FIG. 2 to generate executable code to perform the patcher and output methods for a hybrid datatype. Code generated by method 600 may be distributed across audiovisual streaming environment 200 in any suitable fashion. For example, code may be generated for client system 210 (e.g., in broadcast program 248, streaming program 230, or any other suitable location), code running on server system 262, and/or code running on remote client system 270 (e.g., as part of media viewer program 290). Code generation method 600 may be performed on one of the devices in audiovisual streaming environment 200, or at a separate development device (e.g., the developer's computer). Code generation method 600 may be performed based on one or more hybrid data types, in which case code generated for each of the hybrid data types may be distributed across audiovisual streaming environment 200 in any suitable fashion. For example, method 600 may be performed at the developer's computer to generate a patcher method for datatype 300 of FIG. 3A based on the interface definition of FIG. 3E, and according to patcher method 400 of FIG. 4A. As another example, method 600 may be used in broadcast program 248 to generate an output method for datatype 300 based on the interface definition of FIG. 3E, and according to output method 500 of FIG. 5A. In yet another example, method 600 may be performed at server system 262, which may be configured to 1) receive new interface definitions defined by a developer of an audiovisual streaming system, 2) perform method 600 to automatically generate patcher and output methods based on developer-defined interface definitions, and 3) distribute suitable executable code to source client system 210 to include in broadcast program 248 and to remote client system 270 to include in media viewer program 290.

At 601, method 600 includes receiving interface definition code defining a hybrid datatype, such as the pseudocode shown in FIG. 3E. This code may be in any suitable format, including a native source code format, a data exchange language (e.g., JSON) or a domain-specific language. At block 610 starting at 611, method 600 includes generating a class definition based on the interface definition code. At 611, generating the class definition may include generating an optimized memory layout specifying a configuration for storing and retrieving values of the static properties of the hybrid datatype. For example, such optimization may include packing and alignment based on type and size information of the static properties. At 612, generating the class definition may include generating optimized methods for utilizing the static properties. These methods may provide an efficient implementation of operations for accessing or modifying the static properties. At 613, generating the class definition may include generating initialization methods for the static properties and for a mapper instance. Such initialization methods allow initializing a default or partially defined instance of the hybrid datatype, based on defining some or all of the static properties at the time of initialization. At 614, generating the class definition may include generating patcher methods. For example, the patcher methods may specify how to perform method 400 with regard to the hybrid datatype. This may include utilizing the static properties of the generated class in order to perform the patcher static update method 410' of FIG. 4B, and utilizing a mapper instance in order to perform the patcher dynamic update method 430 of FIG. 4C. At 615, generating the class definition may include generating output methods. For example, the output methods may specify how to perform method 500 with regard to the hybrid datatype. This may include utilizing a mapper instance when outputting a dynamic property, as in dynamic output method 530' of FIG. 5B. Finally, after generating a class definition, method 600 includes outputting executable code at 620.

At 620, the generated code may specify the static and dynamic interfaces of a hybrid datatype in any suitable fashion, for example, as a programming language source or header file, as an application binary interface supplied by a programming language compiler or runtime, or in any suitable fashion determined by a developer of a backend service for state management of dynamic properties. For example, when the broadcast program is a video game program implemented in C++, the static interface for datatype 300 (shown in FIG. 3A) may be defined within a C++ header file as source code defining a C++ class including static properties corresponding to field names 303 and field types 304. Such a class definition includes information useable to configure the computer memory to hold the fields in static interface 302. In the same example, the dynamic interface may be defined via additional fields and methods of the C++ class suitable to store an instance of a mapper data structure, the methods executable to provide the functionality of mapper 305 as described above with reference to FIG. 4-5. The dynamic interface may further include a field of the C++ class to store textual data representing the code fragment in the shared serialized format (e.g., as with code fragment slot 306 of FIG. 3A). The example specifications of static and dynamic interfaces of a hybrid datatype described above are non-limiting, and a backend service for state management of dynamic properties may generate code specifying the static and dynamic interfaces of a hybrid datatype in any other suitable fashion. For example, the generated code may be distributed across multiple source and header files or partially implemented in a 3rd-party library. The generation of code may include generating source code as plain-text source code or any other suitable form, such as an abstract syntax tree, intermediate representation language code, assembly language code, and/or executable machine code. When the generated code is not executable machine code, outputting executable code at 620 may include compiling, translating, and/or interpreting the generated code to obtain executable code.

The above-described methods may be used in any suitable manner, for example, method 600 may be used by a developer of broadcast program 248 to generate source code for source client system 210. Returning to FIG. 2, when broadcast program 248 is a video game program, such generated code may comprise C++ code which may be compiled via an optimized game engine to produce executable code. Such generated source code may instantiate one or more hybrid data types, comprising code executable to patch and output hybrid data instances of the hybrid data types, based on the hardware and/or software configuration and according to the static datatype definition, as described above.

For example, the hybrid format definition may comprise code executable in streaming program 230 to interpret inbound streaming packets 295 comprising data in the shared serialized format to produce processed remote input 296, suitable for use in broadcast program 248 (e.g., according to method 400). The hybrid format definition may further comprise code executable in streaming program 230 to translate outbound production state data 249 into outbound streaming packets 234 in the shared serialized format (e.g., according to method 500).

Alternately, the hybrid format definition may comprise code executable on server system 262 to translate binary data contained in outbound streaming packets 234 corresponding to the native data format of broadcast program 248 into the shared serialized format and vice versa, (e.g., according to methods 400 and 500).

Similarly, method 600 may be used to generate code executable by remote client system 270, which may include code executable in media viewer program 290 to translate inbound processed production state data 298 from the shared serialized format into a hybrid format suitable for processing in media viewer program 290 (e.g., according to method 400), and/or code executable to translate hybrid data received from interactive controls 292 to produce remote input 294 in the shared serialized format (e.g., according to method 500).

Figure 7:
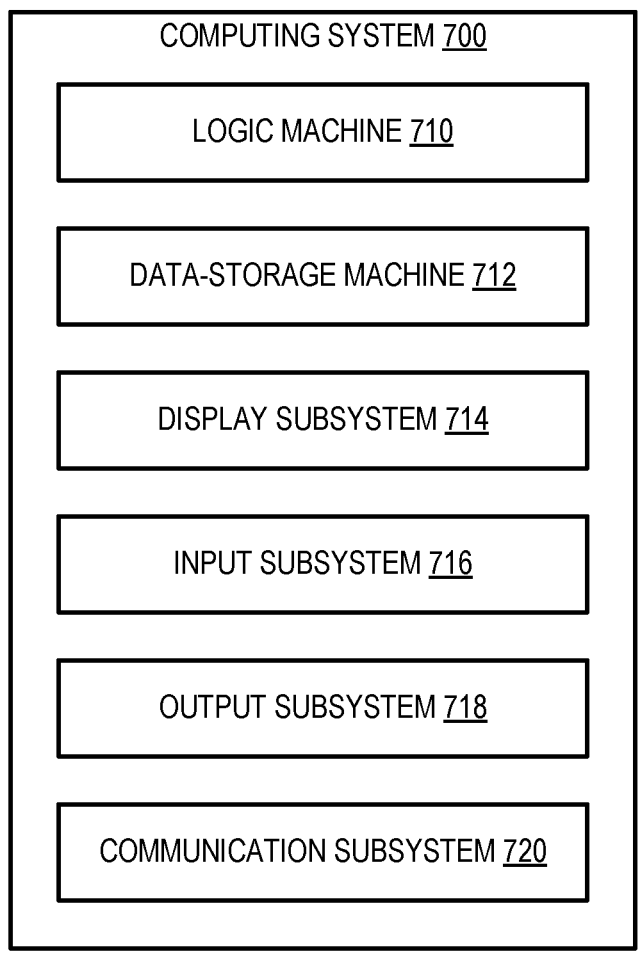
FIG. 7 shows an example computing system.

FIG. 7 schematically shows a non-limiting example of a computing system 700 that can enact one or more of the methods and processes described above. For example, computing system 700 may be representative of the various computing devices and/or computing platforms of FIG. 2 including source client system 210, remote client system 270, and server system 262. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 710 and a data-storage machine 712. Computing system 700 may optionally include a display subsystem 714 (e.g., an integrated or peripheral graphical display device), an input subsystem 716, an output subsystem 718, and a communication subsystem 720, and/or other components not shown in FIG. 7.

Logic machine 710 includes one or more physical devices configured to execute instructions. For example, logic machine 710 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 710 may include one or more processors configured to execute software instructions. Additionally or alternatively, logic machine 710 may include one or more hardware or firmware logic machines configured to execute hardware or firmware instructions. Processors of the logic machine may be single-core or multi-core, and the instructions executed thereon may be configured for sequential, parallel, and/or distributed processing. Individual components of logic machine 710 optionally may be distributed among two or more separate devices, which may be remotely located and/or configured for coordinated processing. Aspects of logic machine 710 may be virtualized and executed by remotely accessible, networked computing devices configured in a cloud-computing configuration.

Data-storage machine 712 includes one or more physical devices configured to hold instructions executable by logic machine 710 to implement the methods and processes described herein. When such methods and processes are implemented, the state of data-storage machine 712 may be transformed—e.g., to hold different data.

Data-storage machine 712 may include removable and/or built-in devices. Data-storage machine 712 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data-storage machine 712 may include volatile, nonvolatile, dynamic, static, read/write, read-only, random-access, sequential-access, location-addressable, file-addressable, and/or content-addressable devices.

It will be appreciated that data-storage machine 712 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices.

Logic machine 710 and data-storage machine 712 may be collectively referred to as a computing platform, in some examples. Aspects of logic machine 710 and data-storage machine 712 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 710 executing instructions held by data-storage machine 712. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices. As an example, a service hosted at server system 262 of FIG. 2 may facilitate streaming from source client system 210 to a population of many receiving client systems of which remote client system 270 is an example.

When included, display subsystem 714 may be used to present a visual representation of data held by data-storage machine 712. This visual representation may take the form of a graphical user interface (GUI). As the herein described methods and processes change the data held by the storage machine, and thus transform the state of the storage machine, the state of display subsystem 714 may likewise be transformed to visually represent changes in the underlying data. Display subsystem 714 may include one or more graphical display devices utilizing virtually any type of technology. Such display devices may be combined with logic machine 710 and/or data-storage machine 712 in a shared enclosure (e.g., as depicted with reference to broadcast computing device 110 of FIG. 1). In other example, such display devices may be peripheral display devices.

When included, input subsystem 716 may comprise or interface with one or more user-input devices such as a keyboard, mouse, touch screen, game controller, microphone, inertial sensor, etc. For example, a microphone of input subsystem 716 may be integrated with a computing platform containing logic machine 710 and data-storage machine 712 via a common enclosure, or the microphone may be a peripheral device that is separate from and interfaces with the computing platform via one or more wired or wireless communication links. A wireless microphone may provide a microphone audio stream to a computing device over a wireless communications link using a wireless protocol, such as Bluetooth, as a non-limiting example.

In some implementations, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, output subsystem 718 may comprise or interface with one or more output devices such as an audio speaker, a haptic feedback device (e.g., a vibration motor), etc. For example, an audio speaker of output subsystem 718 may be integrated with a computing platform containing logic machine 710 and data-storage machine 712 via a common enclosure, or the audio speaker may be a peripheral device that is separate from and interfaces with the computing platform via one or more wired or wireless communication links.

When included, communication subsystem 720 may be configured to communicatively couple computing system 700 with one or more other computing devices. Network transceiver 259 of FIG. 2 is an example of communication subsystem 720. Communication subsystem may include wired and/or wireless communication devices compatible with one or more different communication protocols. As non-limiting examples, the communication subsystem may be configured for communication via a wireless telephone network, or a wired or wireless local- or wide-area network. In some implementations, the communication subsystem may allow computing system 700 to send and/or receive messages to and/or from other devices via a network such as the Internet.

In an example, a method comprises: executing a video game program; broadcasting a stream of the video game program to one or more viewing computers; storing video game information of the video game program using a data instance instantiated according to a hybrid data type including: one or more static properties, a dynamic mapper, and a fragment storage slot; receiving a code fragment in a data exchange language, the code fragment sent from a viewing computer and requesting an update to the stored video game information; updating the one or more static properties and the dynamic mapper based on the code fragment; and storing the code fragment into the fragment storage slot. In this or any other example, the code fragment sent from the viewing computer includes a computer-readable description of an interaction between a user of the viewing computer and a player of the video game program. In this or any other example, the code fragment sent from the viewing computer includes a computer-readable description of an input to the video game program, and wherein updating the one or more static properties and the dynamic mapper based on the code fragment results in an updated game state based on the input to the video game program.

In an example, a computing system comprises: a logic machine; and a storage machine holding instructions executable by the logic machine to: execute an electronic sports production program configured to: receive game state data via a computer network from a plurality of gaming computers executing a multiplayer game, and broadcast an electronic sports stream via the computer network to a plurality of viewing computers, the electronic sports stream including an audiovisual depiction of gameplay of the multiplayer game; store production information of the electronic sports stream using a data instance instantiated according to a hybrid data type including: one or more static properties, a dynamic mapper, and a fragment storage slot; receive a code fragment in a data exchange language, the code fragment sent from a viewing computer and requesting an update to the stored production information; update the one or more static properties and the dynamic mapper based on the code fragment; and store the code fragment into the fragment storage slot. In this or any other example, the production information of the electronic sports stream includes a wager from a viewer of the audiovisual stream.

In an example, a method comprises executing a broadcasting program configured to broadcast an audiovisual stream via a computer network to a plurality of viewing computers; storing production information of the audiovisual stream using a data instance instantiated according to a hybrid data type including: one or more static properties, a dynamic mapper, and a fragment storage slot; receiving a code fragment in a data exchange language, the code fragment sent from a viewing computer and requesting an update to the stored production information; updating the one or more static properties and the dynamic mapper based on the code fragment; and storing the code fragment into the fragment storage slot. In this or any other example, the audiovisual stream is a broadcast stream of a video game program. In this or any other example, the audiovisual stream is an electronic sports stream. In this or any other example, the audiovisual stream is a live event stream of a live event. In this or any other example, an interactive aspect of the live event is controlled responsive to updates to the one or more static properties and responsive to updates to the dynamic mapper. In this or any other example, the interactive aspect of the live event includes an audio track to be played. In this or any other example, before receiving the code fragment, the fragment storage slot already contains an old code fragment, and wherein storing the code fragment into the fragment storage slot includes merging the code fragment with the old code fragment. In this or any other example, the code fragment and the old code fragment are logs of time-stamped key-value pairs, and where merging the code fragment and the old code fragment includes making a new log including the time-stamped key-value pairs of the old code fragment and the time-stamped key-value pairs of the code fragment, the time-stamped key-value pairs arranged in the new log in order according to the time-stamps. In this or any other example, the data exchange language is a structured data format usable to organize a plurality of primitive data including number data and string data. In this or any other example, the structured data format is usable to arrange the plurality of primitive data in one or both of an array and a set of key-value pairs. In this or any other example, the structured data format is further usable to recursively embed a first data structure defined in the data exchange language within a second data structure also defined in the data exchange language. In this or any other example, the one or more static properties are stored in a native storage format of the broadcasting program, the native storage format based on a programming language used to define aspects of the broadcasting program. In this or any other example, the one or more static properties are stored in a native storage format of the broadcasting program, the native storage format based on a hardware configuration of a computer executing the broadcasting program. In this or any other example, the method further comprises validating the code fragment before updating the one or more static properties and the dynamic mapper based on the code fragment. In this or any other example, the one or more static properties are defined by automatically generating data structure code based on a static interface description, the data structure code executable to store and utilize an instance of a data structure defining the one or more static properties.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method, comprising:
executing a broadcasting program configured to broadcast an audiovisual stream via a computer network to a plurality of viewing computers;
storing production information of the audiovisual stream using a data instance instantiated according to a hybrid data type including:
one or more static properties,
a dynamic mapper, and
a fragment storage slot;
receiving a code fragment in a data exchange language, the code fragment sent from a viewing computer and requesting an update to the stored production information;
updating the one or more static properties and the dynamic mapper based on the code fragment; and
storing the code fragment into the fragment storage slot.

2. The method of claim 1, wherein the audiovisual stream is a broadcast stream of a video game program.

3. The method of claim 1, wherein the audiovisual stream is an electronic sports stream.

4. The method of claim 1, wherein the audiovisual stream is a live event stream of a live event.

5. The method of claim 4, wherein an interactive aspect of the live event is controlled responsive to updates to the one or more static properties and responsive to updates to the dynamic mapper.

6. The method of claim 5, wherein the interactive aspect of the live event includes an audio track to be played.

7. The method of claim 1, wherein before receiving the code fragment, the fragment storage slot already contains an old code fragment, and wherein storing the code fragment into the fragment storage slot includes merging the code fragment with the old code fragment.

8. The method of claim 7, wherein the code fragment and the old code fragment are logs of time-stamped key-value pairs, and where merging the code fragment and the old code fragment includes making a new log including the time-stamped key-value pairs of the old code fragment and the time-stamped key-value pairs of the code fragment, the time-stamped key-value pairs arranged in the new log in order according to the time-stamps.

9. The method of claim 1, wherein the data exchange language is a structured data format usable to organize a plurality of primitive data including number data and string data.

10. The method of claim 9, wherein the structured data format is usable to arrange the plurality of primitive data in one or both of an array and a set of key-value pairs.

11. The method of claim 10, wherein the structured data format is further usable to recursively embed a first data structure defined in the data exchange language within a second data structure also defined in the data exchange language.

12. The method of claim 1, wherein the one or more static properties are stored in a native storage format of the broadcasting program, the native storage format based on a programming language used to define aspects of the broadcasting program.

13. The method of claim 1, wherein the one or more static properties are stored in a native storage format of the broadcasting program, the native storage format based on a hardware configuration of a computer executing the broadcasting program.

14. The method of claim 1, further comprising validating the code fragment before updating the one or more static properties and the dynamic mapper based on the code fragment.

15. The method of claim 1, wherein the one or more static properties are defined by automatically generating data structure code based on a static interface description, the data structure code executable to store and utilize an instance of a data structure defining the one or more static properties.

16. A method, comprising:
   executing a broadcasting program configured to broadcast an audiovisual stream including a broadcast stream of a video game program via a computer network to a plurality of viewing computers;
   storing production information of the audiovisual stream using a data instance instantiated according to a hybrid data type including:
      one or more static properties,
      a dynamic mapper, and
      a fragment storage slot;
   receiving a code fragment in a data exchange language including a computer-readable description of an interaction between a user of a viewing computer and a player of the video game program, the code fragment sent from the viewing computer and requesting an update to the stored production information;
   updating the one or more static properties and the dynamic mapper based on the code fragment; and
   storing the code fragment into the fragment storage slot.

17. A method, comprising:
   executing a broadcasting program configured to broadcast a live event stream of a live event via a computer network to a plurality of viewing computers;
   storing production information of the live event stream using a data instance instantiated according to a hybrid data type including:
      one or more static properties,
      a dynamic mapper, and
      a fragment storage slot;
   receiving a code fragment in a data exchange language, the code fragment sent from a viewing computer and requesting an update to the stored production information;
   updating the one or more static properties and the dynamic mapper based on the code fragment; and
   storing the code fragment into the fragment storage slot.

18. The method of claim 17, wherein an interactive aspect of the live event is controlled responsive to updates to the one or more static properties and responsive to updates to the dynamic mapper.

19. The method of claim 18, wherein the interactive aspect of the live event includes an audio track to be played.

20. The method of claim 17, wherein the live event stream is an electronic sports stream.

\* \* \* \* \*